(12) United States Patent
Edler et al.

(10) Patent No.: US 10,774,989 B2
(45) Date of Patent: Sep. 15, 2020

(54) LUBRICANT INJECTOR WITH IMPROVED PISTON

(71) Applicant: Lincoln Industrial Corporation, St. Louis, MO (US)

(72) Inventors: Brad Edler, Fults, IL (US); Chris Holland, Wood River, IL (US); Paul Conley, St. Charles, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 461 days.

(21) Appl. No.: 15/850,348

(22) Filed: Dec. 21, 2017

(65) Prior Publication Data

US 2019/0195424 A1    Jun. 27, 2019

(51) Int. Cl.
| | | |
|---|---|---|
| *F16N 25/02* | (2006.01) | |
| *F16K 11/044* | (2006.01) | |
| *F16N 27/00* | (2006.01) | |
| *F16N 7/38* | (2006.01) | |

(52) U.S. Cl.
CPC ............ *F16N 25/02* (2013.01); *F16K 11/044* (2013.01); *F16N 27/00* (2013.01); *F16N 7/38* (2013.01); *F16N 2270/20* (2013.01)

(58) Field of Classification Search
CPC . F16N 25/02; F16N 27/00; F16N 7/38; F16N 2270/20; F16K 11/044
See application file for complete search history.

(56) References Cited

U.S. PATENT DOCUMENTS

| | | | | | |
|---|---|---|---|---|---|
| 2,358,719 | A | * | 9/1944 | Klein | .................. F16K 11/0712 |
| | | | | | 222/335 |
| 2,637,413 | A | * | 5/1953 | Fox | ......................... F16N 27/00 |
| | | | | | 184/7.4 |
| 3,013,633 | A | * | 12/1961 | Rotter | ..................... F16N 27/00 |
| | | | | | 184/7.4 |
| 9,243,749 | B2 | * | 1/2016 | Clark | ....................... F16N 25/00 |
| 2003/0089553 | A1 | * | 5/2003 | Conley | .................... F16N 25/02 |
| | | | | | 184/7.4 |
| 2013/0092475 | A1 | * | 4/2013 | Arens | ..................... F16N 27/00 |
| | | | | | 184/7.4 |
| 2018/0149310 | A1 | * | 5/2018 | Radzyuk | ................. F16N 27/00 |
| 2019/0195423 | A1 | * | 6/2019 | Edler | ...................... F16N 25/02 |
| 2019/0195424 | A1 | * | 6/2019 | Edler | ...................... F16N 27/00 |

* cited by examiner

*Primary Examiner* — Michael A Riegelman

(57) ABSTRACT

A lubricant injector includes a body having an inlet at a first end fluidly coupleable to a lubricant source, an outlet, a delivery chamber coupled with the outlet and a bore defined by a substantially circular inner surface with a constant inner diameter and spaced axially from the body inlet, the bore having a first port fluidly connected with the body inlet and a second port disposed between the body inlet and the first port and fluidly connected with the delivery chamber. A generally circular cylindrical piston is disposed within the bore so as to divide the bore into an operating chamber fluidly coupled with the first port and a measuring chamber fluidly coupled with the second port and located axially between the operating chamber and the body first end. The piston has an outer circumferential slidably disposed against the bore inner surface and having a generally constant outside diameter.

20 Claims, 18 Drawing Sheets

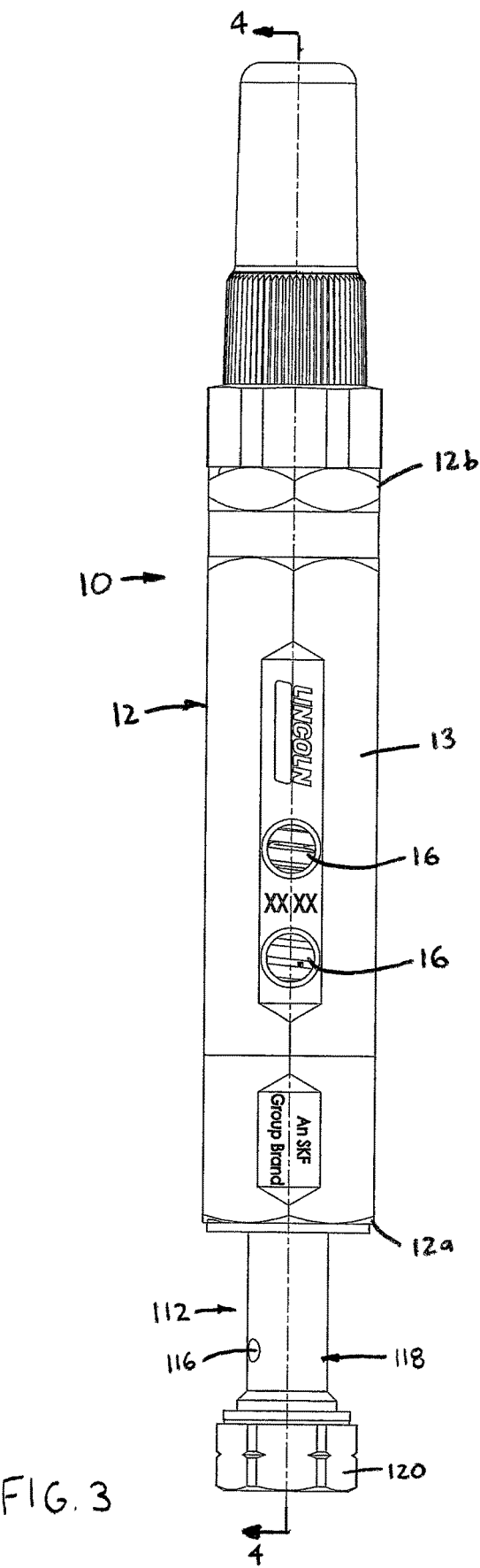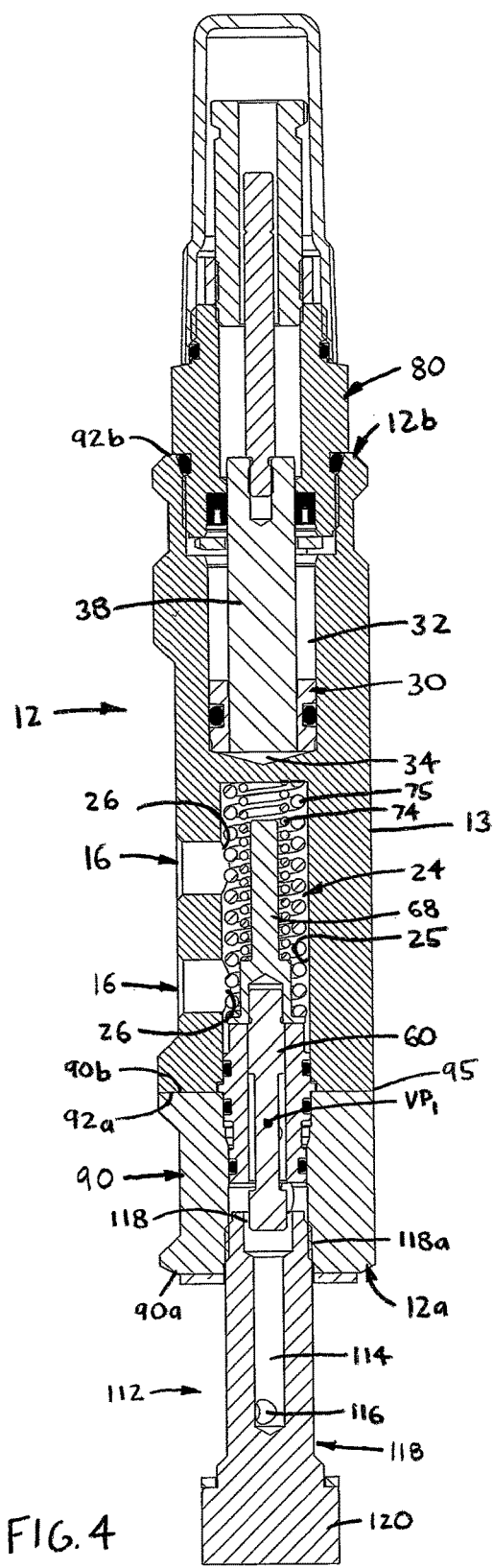

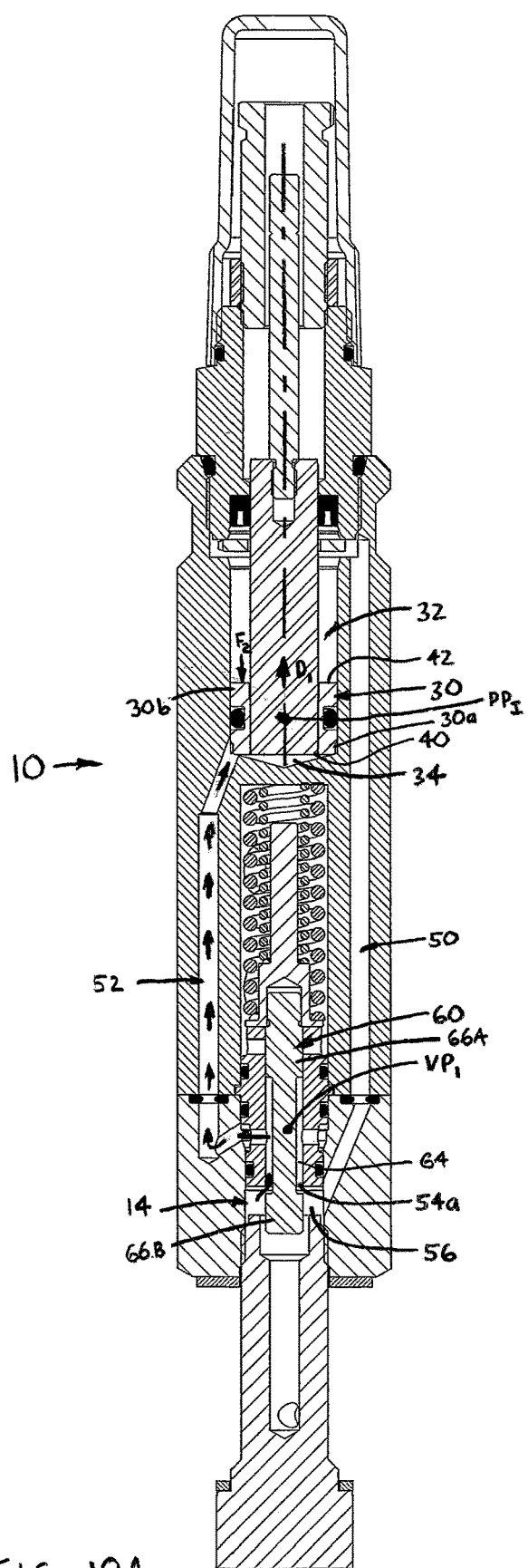
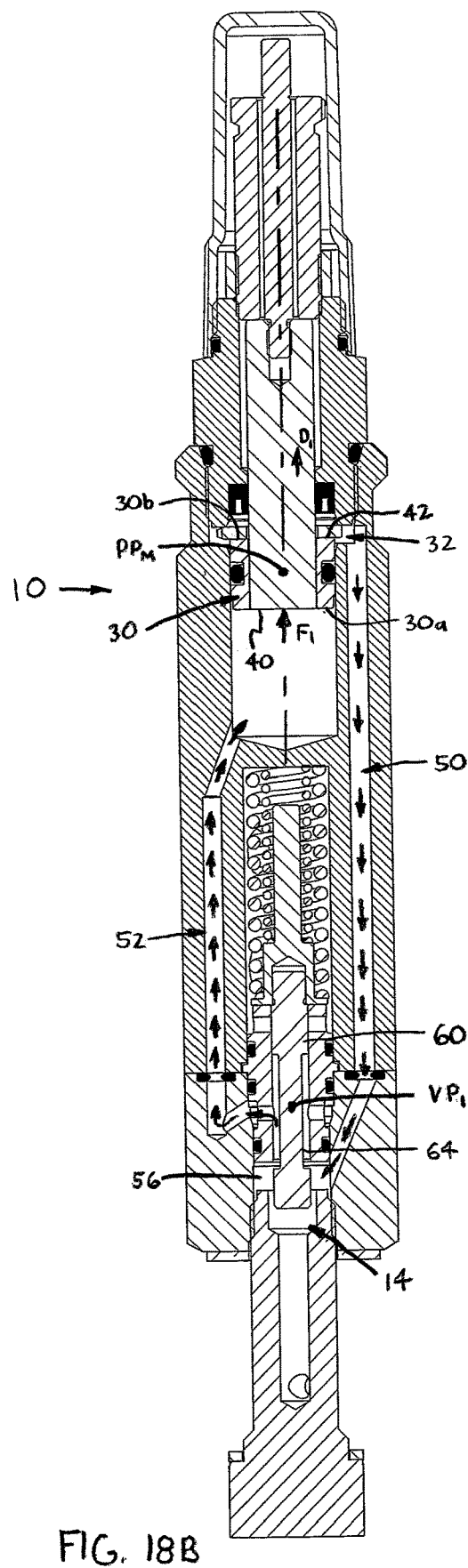
FIG. 18A
FIG. 18B

LUBRICANT INJECTOR WITH IMPROVED PISTON

BACKGROUND OF THE INVENTION

The present invention relates to lubrication systems, and more particularly to lubricant injectors used in lubrication systems.

Lubricant injectors are known and typically include a body connectable to source of lubricant and an outlet connected to a point of delivery of lubricant, such as for example, a bearing. A piston is disposed within the body and functions to draw lubricant into the body and then dispense the lubricant through the outlet. Various passages and one or more valves within the injector body direct lubricant flow in a desired manner through the body.

SUMMARY OF THE INVENTION

In one aspect, the present invention is a lubricant injector for delivering a predetermined quantity of lubricant, the injector comprising a body having opposing first and second ends and a longitudinal axis extending generally between the two ends, the body including an inlet at the first end fluidly coupleable to a source of lubricant, an outlet, and a delivery chamber fluidly coupled with the outlet. An elongated bore is spaced axially from the body inlet and has a first port fluidly connected with the body inlet and a second port disposed axially between the body inlet and the first port and fluidly connected with the delivery chamber. The bore is defined by a substantially circular cylindrical inner circumferential surface having an inside diameter, the inside diameter having a substantially constant value along the axis. A piston is disposed within the elongated bore so as to divide the bore into an operating chamber fluidly coupled with the first port and a measuring chamber fluidly coupled with the second port, the measuring chamber being located axially between the operating chamber and the body first end. The piston includes a generally circular cylindrical body having opposing first and second axial ends and an outer surface and an outer circumferential surface extending axially between the ends and slidably disposed against the bore inner surface. The outer surface has an outside diameter that is generally constant along the axis between the first and second ends.

In another aspect, the present invention is again a lubricant In one aspect, the present invention is a lubricant injector for delivering a predetermined quantity of lubricant, the injector comprising a body having opposing first and second ends and a longitudinal axis extending generally between the two ends, the body including an inlet at the first end fluidly coupleable to a source of lubricant, an outlet, and a delivery chamber fluidly coupled with the outlet. An elongated bore is spaced axially from the body inlet and has a first port fluidly connected with the body inlet and a second port disposed axially between the body inlet and the first port and fluidly connected with the delivery chamber. The bore is defined by a substantially circular cylindrical inner circumferential surface having an inside diameter, the inside diameter having a substantially constant value along the axis. A piston is disposed within the elongated bore so as to divide the bore into an operating chamber fluidly coupled with the first port and a measuring chamber fluidly coupled with the second port, the measuring chamber being located axially between the operating chamber and the body first end. The piston includes a generally circular cylindrical body having opposing first and second axial ends and an outer surface and an outer circumferential surface extending axially between the ends and slidably disposed against the bore inner surface. The outer surface has an outside diameter that is generally constant along the axis between the first and second ends. Further, a rod is connected with the piston so as to extend generally axially away from the piston second axial end and through the operating chamber section, the rod having an outside diameter. The piston has a first, substantially circular radial pressure surface on the first axial end, the first pressure surface partially bounding the measuring chamber and having a first surface area, and a second, generally annular radial pressure surface on the second axial end defined between the rod outer perimeter and the piston outer perimeter.

The second pressure surface partially bounds the operating chamber and has a second surface area. The piston is axially displaceable solely by a differential between a first force generated by lubricant pressure exerted on the first pressure surface and a second force generated by lubricant pressure exerted on the second pressure surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3 is a front elevational view of the injector;

FIG. 4 is an axial cross-sectional view through line 4-4 of FIG. 3;

FIGS. 18A-18D, collectively FIG. 18, are each an axial cross-sectional view of the injector each depicting a separate one of four stages of operation of the injector.

DETAILED DESCRIPTION OF THE INVENTION

Figure 1:
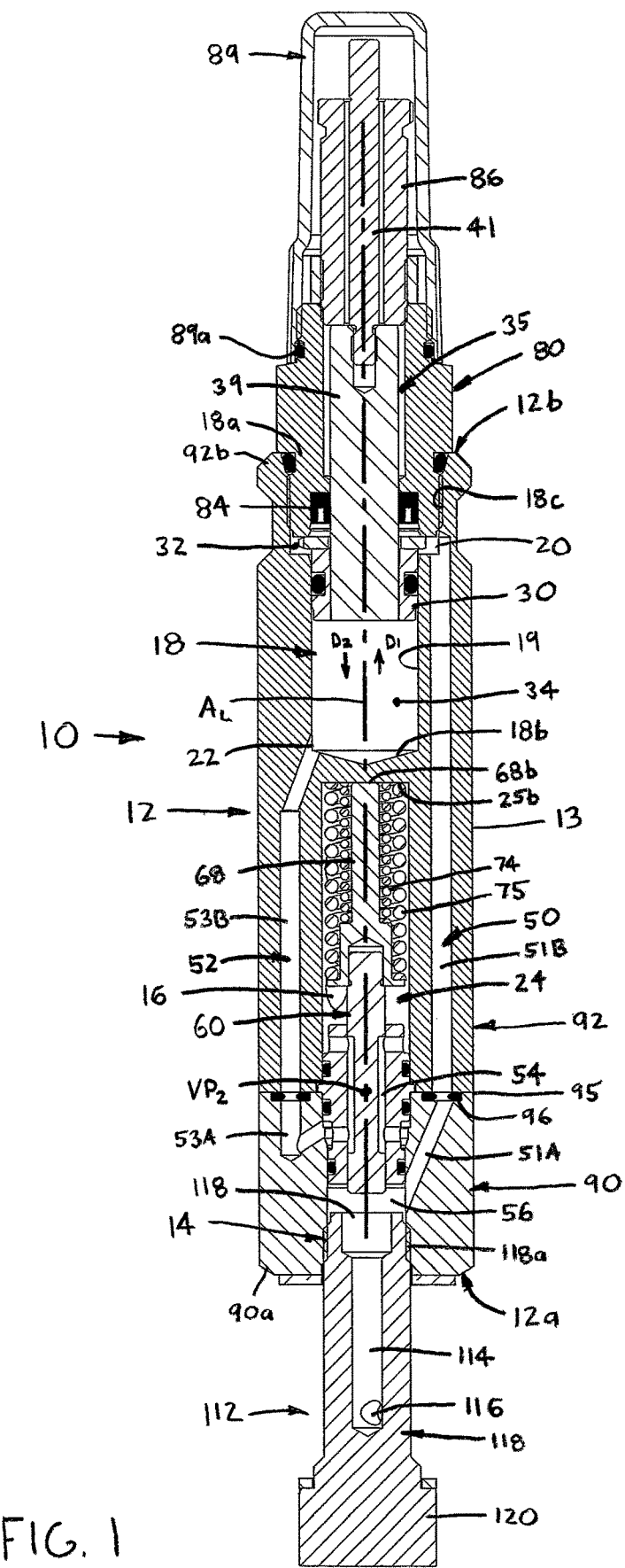
FIG. 1 is an axial cross-section of a lubricant injector in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-18 a lubricant injector 10 for delivering a predetermined quantity of lubricant, preferably grease, to a delivery point PD such as a bearing 1 or other device to be lubricated. The injector 10 is a component of a lubrication system 2 including a lubricant supply 3, a pump 4 for pressurizing the lubricant, and a plurality of fluid supply lines 5 and delivery lines 6, such as hoses, pipes, etc., as shown in FIG. 2. The injector 10 comprises a body 12 having opposing first and second ends 12a, 12b and a longitudinal axis $A_L$ extending generally between the two ends 12a, 12b. The body 12 is preferably generally elongated along the axis $A_L$, as depicted in FIGS. 1-5, 10 and 18 and described in further detail below, but may be generally "blocky" or compact (e.g., generally rectangular, etc.). In any case, the body 12 includes an inlet 14 fluidly coupleable to the source of lubricant 3, the inlet 14 preferably extending through the body first end 12a, and at least one and preferably two outlets 16, which each preferably extend through a sidewall 13 between the body ends 12a, 12b. Typically, only one outlet 16 is used for a particular application and the other one is plugged (not shown) although both outlets 16 may be used in certain applications. Further, the body 12 includes an elongated bore 18 extending generally along the body axis $A_L$ and having an outer end 18a located at, and preferably extending through, the body second end 12b and a closed inner end 18b spaced axially from the body first end 12a. The bore 18 has a first port 20 and a second port 22 disposed generally axially between the bore closed end 18b and the first port 20.

Figure 6:
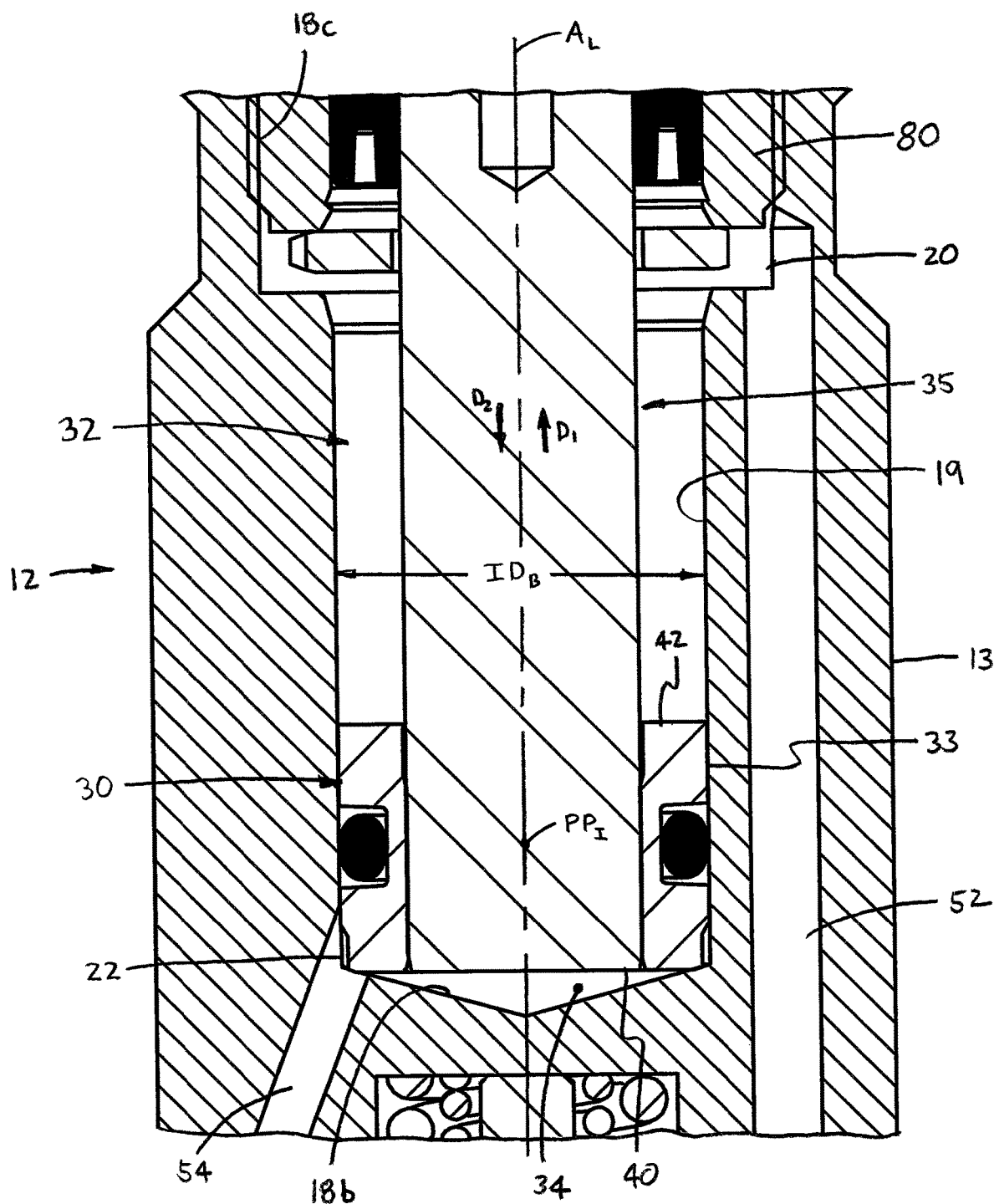
FIG. 6 is a broken-away, enlarged view of a portion of FIG. 1, showing a piston in an initial position.
Figure 7:
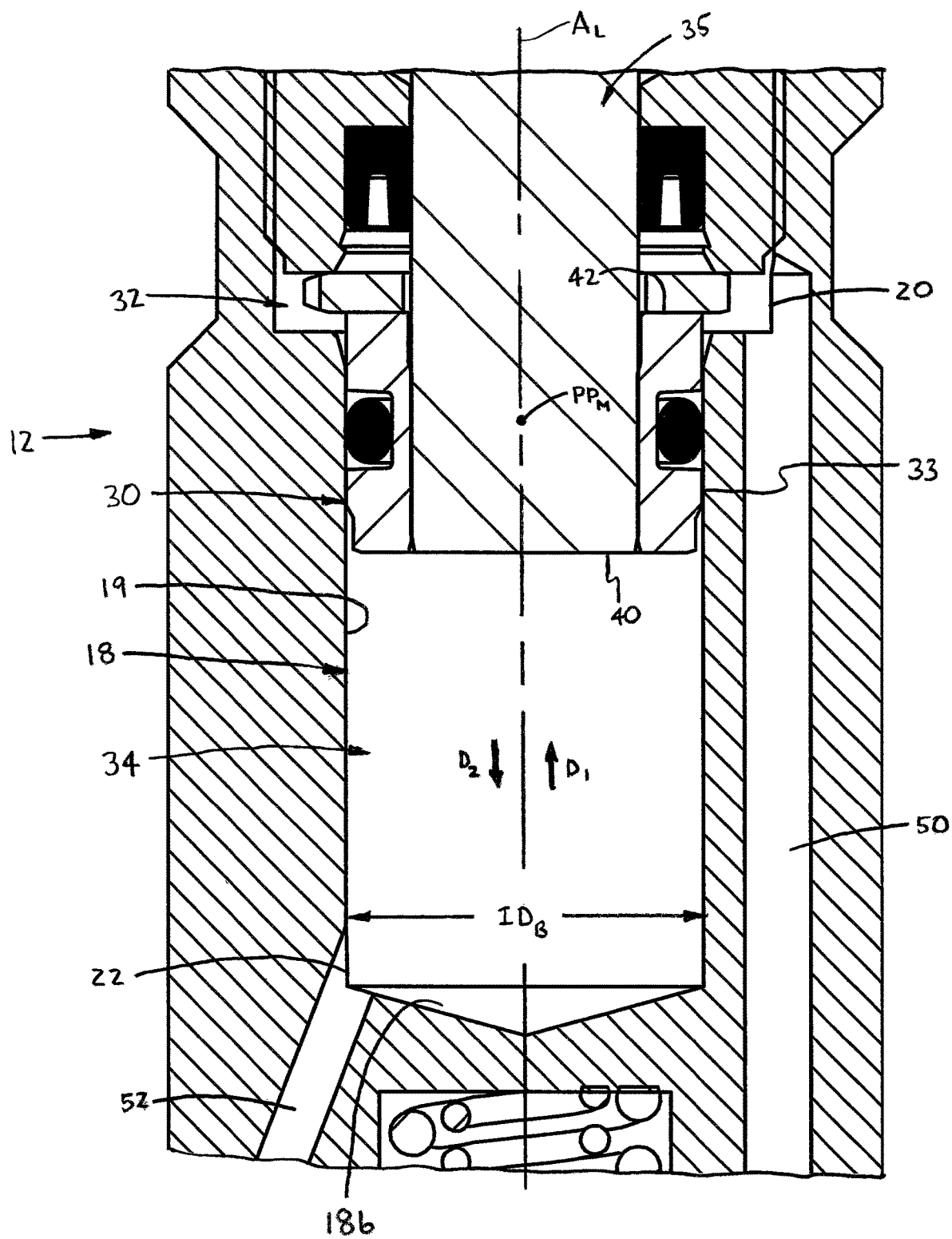
FIG. 7 is another view of the injector portion shown in FIG. 6, depicting the piston in a maximum volume position.
Figure 10:
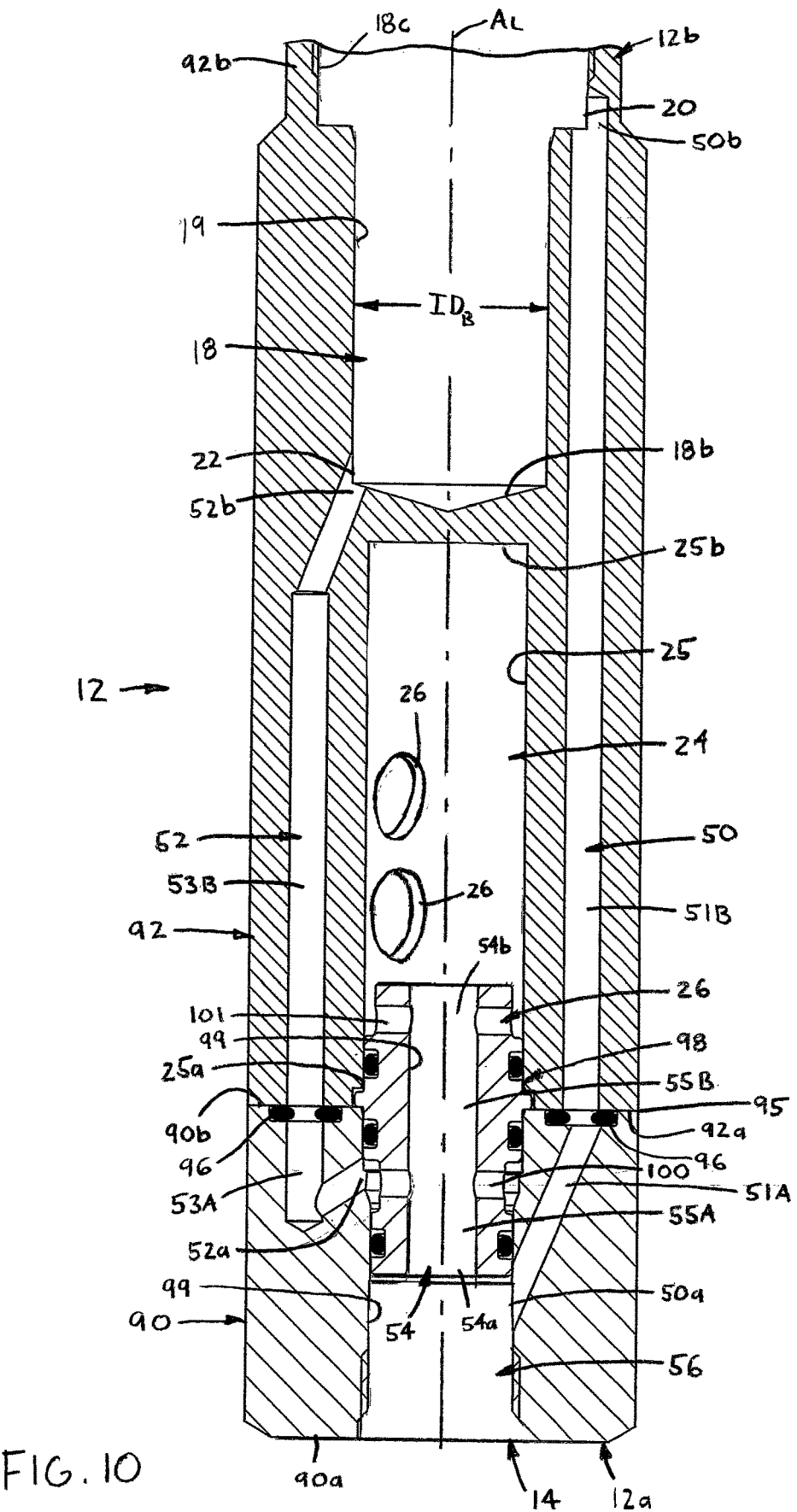
FIG. 10 is partly broken-away axial cross-sectional view of the injector body shown without the piston, rod and a valve.

Referring to FIGS. 6, 7 and 10, the bore 18 is preferably at least partially defined by a substantially circular cylindrical, inner circumferential surface 19 having an inside diameter $ID_B$ with a substantially constant value along the axis $A_L$, such that at least a section of the bore 18 has a constant size between the ends 18a, 18b. Additionally, the bore 18 preferably has a counterbore threaded section 18c located adjacent to the outer end 18a, which is engageable by a plug 80 as described below.

Figure 2:
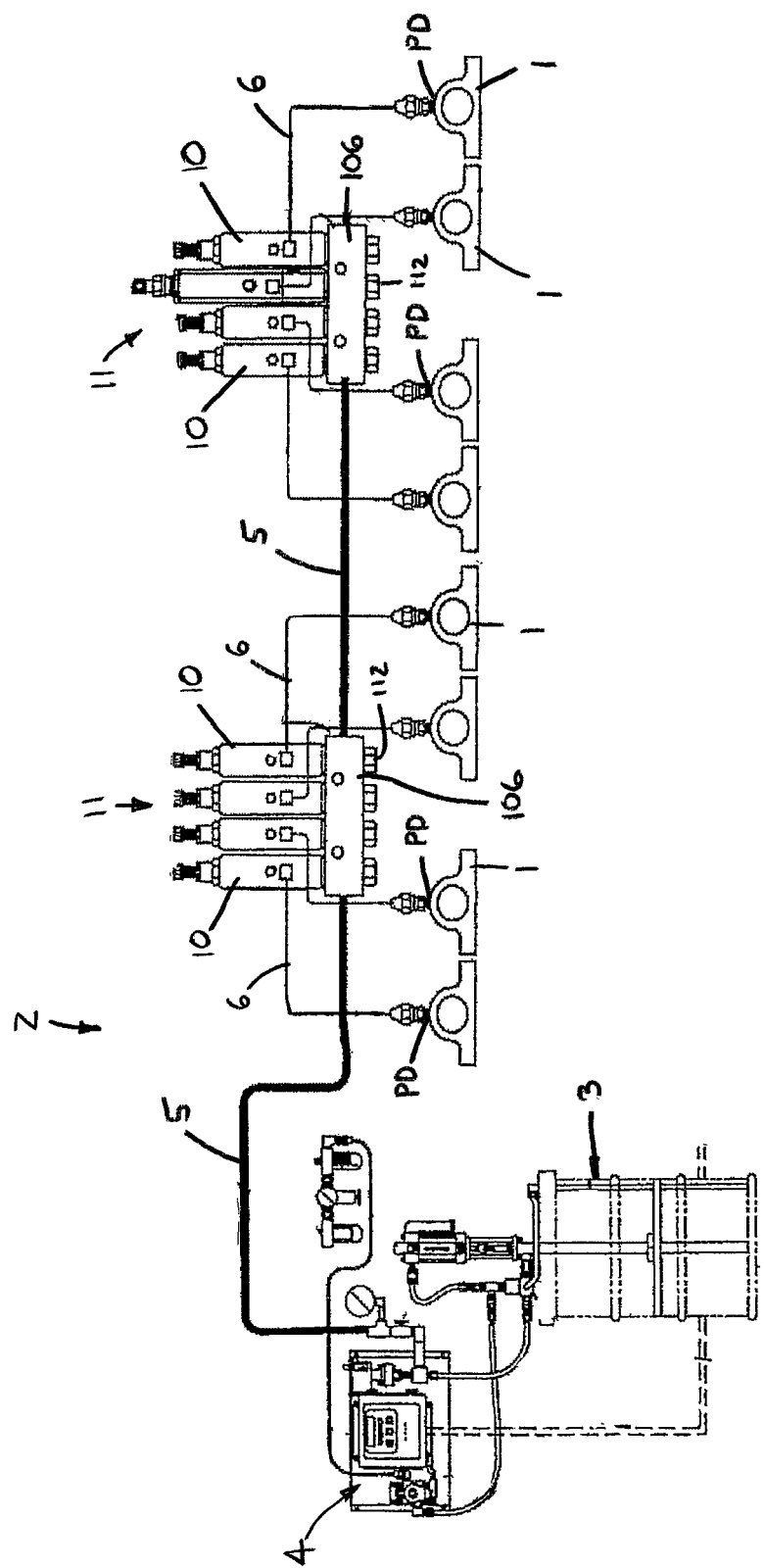
FIG. 2 is a diagrammatic view of an exemplary lubrication system incorporating the injector.

Referring now to FIGS. 1, 4, and 10, the injector body 12 further has a delivery chamber 24 separate from the bore 18 and having an inlet port 26 and at least one and preferably two outlet ports 28 each fluidly coupled with a separate body outlet 16. The delivery chamber 24 is preferably formed as a generally circular cylindrical bore 25 extending generally along the axis $A_L$ and having an outer end 25a providing the inlet and a closed inner end 25b, as indicated in FIG. 10. The delivery chamber 24 is preferably disposed axially between the body first end 12a and the elongated bore 18, but may alternatively be disposed generally between the bore 18 and the sidewall 13.

As shown in FIGS. 1, 4, 6, 7, 16 and 17, the injector 10 further comprises a piston 30 movably disposed within the elongated bore 18 so as to divide the bore 18 into an operating chamber 32 and a measuring chamber 34. The operating chamber 32 is fluidly coupled with the first port 20, and thereby to the body inlet 14 as discussed below, and is used to operate the piston 30, as described in detail hereafter. The measuring chamber 34 is located axially between the bore inner end 18b and the operating chamber 32 and is fluidly coupled with the bore second port 22, so as to be fluidly coupleable with the injector inlet 14 and alternatively with the delivery chamber 24, as discussed in further detail.

Figure 8:
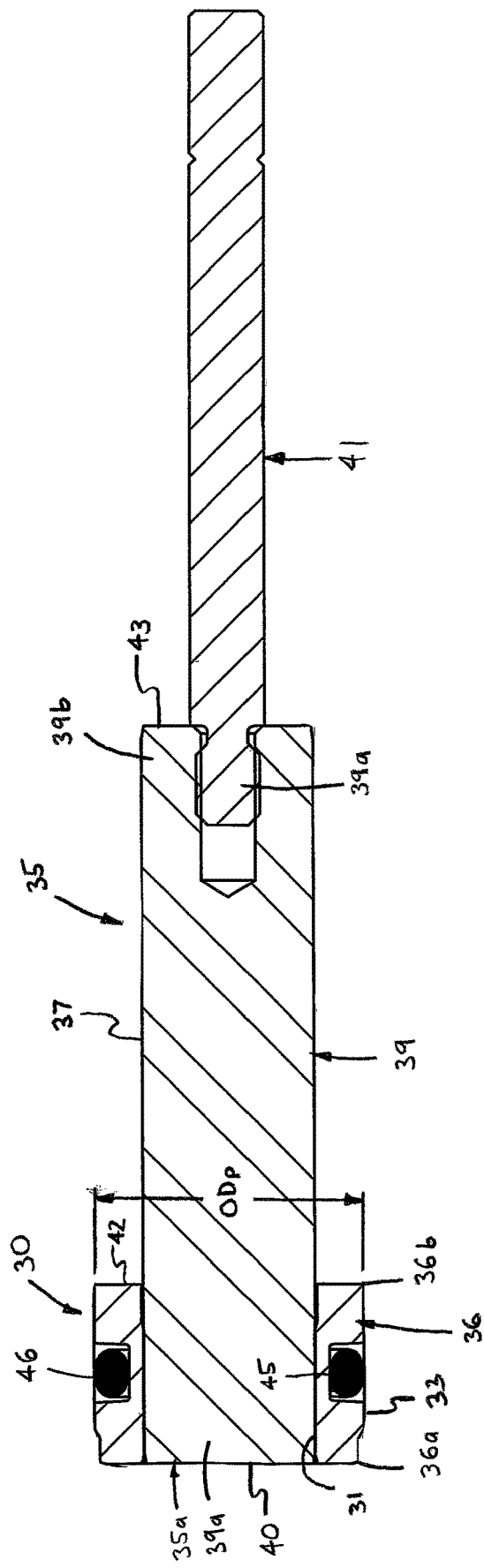
FIG. 8 is an axial cross-sectional view of the piston and a rod.
Figure 9:
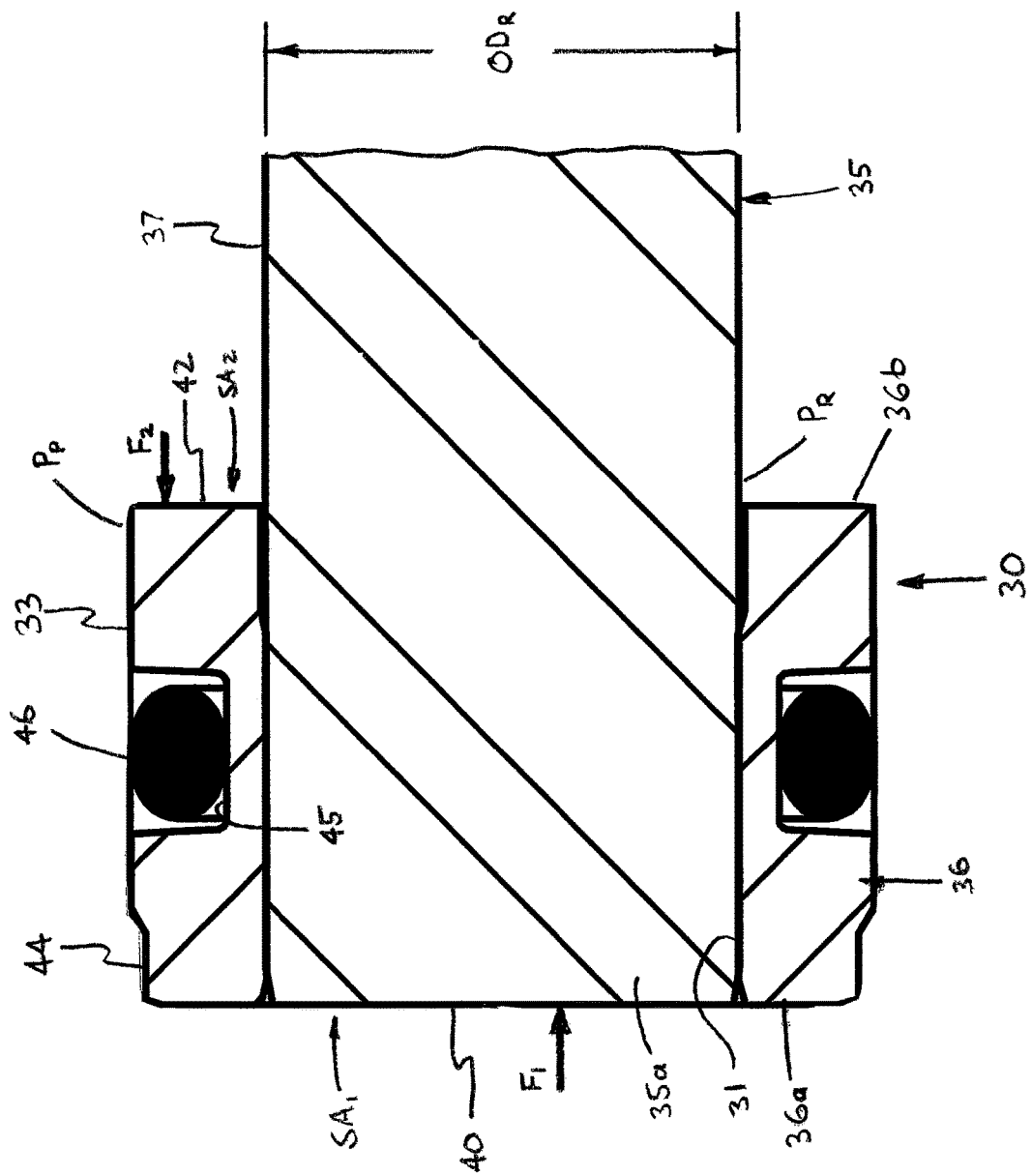
FIG. 9 is an broken-away, enlarged view of a portion of FIG. 8.

Referring to FIGS. 8 and 9, the piston 30 includes a generally circular cylindrical body 36 having opposing first and second axial ends 36a, 36b and an outer circumferential surface 33 extending axially between the ends 36a, 36b and slidably disposed against the bore inner surface 19. The outer surface 33 has an outside diameter $OD_P$ (FIG. 8) having a generally constant value between the first and second axial ends 36a, 36b, which is preferably slightly lesser than the value of the bore inside diameter $ID_B$ such that the piston 30 is slidably displaceable within the bore 18, although the piston 30 preferably has an inwardly offset surface section 44 adjacent to the body first end 36a and spaced inwardly from the bore inner surface 19. Further, a rod 35 is connected with the piston 30 and extends generally axially from the piston second axial end 36b and through the operating chamber 34. Preferably, the rod 35 has a first end 35a disposed within a through-bore 31 of the piston 30, but may alternatively be disposed within a blind hole of the piston or attached to the piston second end 36b (neither alternative shown). Further, the rod 35 has a generally circular outer surface 37 providing a rod outer perimeter $OP_R$ and has an outside diameter $OD_R$ (FIG. 9).

Furthermore, the piston 30 has a first, substantially circular radial pressure surface 40 on the body first axial end 36a and a second, generally annular radial pressure surface 42 on the body second axial end 36b. The circular cylindrical outer circumferential surface 33 extends between the axial ends 36a, 36b and defines an outer perimeter $P_P$ of the piston 30. Preferably, a generally annular groove 45 extends radially-inwardly from the piston outer surface 44 and an annular sealing member 46, for example, an O-ring, is disposed within the groove 45 so as to seal between the piston 30 and the bore 18. Further, the radial pressure surface 40, which is partially provided by an end surface 35b of the rod 35, extends to the piston outer perimeter $P_P$ and partially bounds the measuring chamber 34, i.e., along with the bore inner end 18b and a portion of the bore inner surface 19, and has a first surface area $SA_1$. The second, annular pressure surface 42 is defined between the rod outer perimeter $P_R$ and the piston outer perimeter $OP_P$ and partially bounds the operating chamber 32, along with a portion of the bore inner surface 19, and has a second surface area $SA_2$.

Referring to FIGS. 6, 7 and 9, the piston 30 is axially displaceable (i.e., along the axis $A_L$) solely by a differential between a first force $F_1$ generated by lubricant pressure exerted on the first pressure surface 40 and a second force generated $F_2$ by lubricant pressure exerted on the second pressure surface 42, as indicated in FIG. 9. That is, the piston 30 is displaceable in a first direction $D_1$ along the axis $A_L$ and alternatively displaceable in a second direction $D_2$ along the axis by differentials between the lubricant pressures in the two chambers 32, 34 and without the need for assistance from springs or other devices. When lubricant pressure in the measuring chamber 34 is sufficiently high in comparison with pressure in the operating chamber 32, the piston 30 displaces in the first direction $D_1$ from a piston initial position $PP_I$ and the volume of the measuring chamber 34 increases while the volume of the operating chamber 32 correspondingly decreases until reaching a piston maximum position $PP_M$ (i.e., maximum measuring chamber volume). Likewise, when lubricant pressure in the operating chamber 32 is sufficiently high in comparison with pressure in the measuring chamber 34, the piston 30 displaces in the second direction $D_2$ from the piston maximum position $PP_M$ and the volume of the operating chamber 32 increases while the volume of the measuring chamber 34 correspondingly decreases until reaching the initial position $PP_I$.

Referring to FIGS. 8 and 9, the rod 35 is preferably sized such that a ratio between the rod outside diameter $OD_R$, and thus the rod outer perimeter $P_R$, at the piston second end 30b and the piston outside diameter $OD_P$ is at least 0.5, and preferably within a range of about 0.5 and about 0.7. As such, the relative sizing of the rod 35 and the piston 30 provides a desired ratio between the second pressure surface area $SA_2$ and the first pressure surface area $SA_1$, which provides a desired responsiveness of the injector 10 as discussed in further detail below.

Referring specifically to FIG. 8, the rod 35 is preferably formed of two-piece construction and includes a first, diametrically-larger rod section 39 and a second, diametrically-smaller rod section 41. The first rod section 39 has a first end 39a attached to, and preferably disposed within, the piston 30 and an opposing second end 39b with a generally radial engagement surface 43, the first rod section 39 providing the rod outer perimeter $OP_R$ at the piston second axial end 30b, as described above. The second, diametrically-smaller rod section 41 is attached to the second end 39b of the first rod section 39 and extends through an adjustment member 86, as described below. Alternatively, the rod 35 may be formed of one-piece construction and having a constant or tapering outer diameter $OD_R$, or may be formed of three or more rod sections of any appropriate relative sizing (no alternatives shown).

Referring now to FIGS. 1 and 10-12, the injector body 12 further includes an operating chamber passage 50 for transporting lubricant to and from the operating chamber 32, a measuring chamber passage 52 for transporting lubricant to and from the measuring chamber 34, and a valve passage 54 for coupling the measuring chamber passage 52 with the body 14 inlet and alternately with the delivery chamber 24. Specifically, the operating chamber passage 52 extends between and fluidly connects the body inlet 14 and the first port 20 of the elongated bore 18, and thereby the inlet 14 with the operating chamber 32. The measuring chamber passage 52 extends between and fluidly connects the second port 22 of the elongated bore 18 with the valve passage 54, and thus connects the measuring chamber 34 with the valve passage 54. Further, the valve passage 54 extends between and fluidly connects the body inlet 14 and the inlet port 26 of the delivery chamber 24, and thereby couples the measuring chamber passage 52 with the inlet 14 and the inlet port 26.

Furthermore, the inlet 14 preferably includes an inlet chamber 56 extending inwardly from the body first end 12b, with each of the operating chamber passage 50 and the valve passage 54 having a first end 50a, 54a, respectively, connected with the chamber 56. Thereby, the two passages 50, 54 are fluidly connected through the inlet chamber 56. The operating chamber passage 50 extends from the first end 50a at the inlet chamber 56 to a second end 50b at the bore first port 20, such that the passage 50 fluidly connects the body inlet 14 and the first port 20 of the elongated bore 18. Thus, lubricant flows from the inlet 14, through the operating chamber passage 50 and into the operating chamber 32 and alternatively flows from the operating chamber 32, through the operating chamber passage 50 and the inlet chamber 56, and into the valve passage 54.

The valve passage 54 extends between the first end 54a at the inlet chamber 56 and a second end 54b at the delivery chamber inlet port 26, with a first end 52a of the measuring chamber passage 52 being connected to a central portion of the valve passage 54. As such, the second port 22 of the elongated bore 18 is connected with the body inlet 14 through the measuring chamber passage 52 and a first portion 55A of the valve passage 54 and alternatively to the delivery chamber inlet port 26 through the measuring chamber passage 52 and a second portion 55B of the valve passage 54. With this structure, lubricant flows from the inlet chamber 56, either from externally of the body 12 or from the operating chamber 32, through the valve passage first portion 55A and the measuring chamber passage 52, and into the measuring chamber 34. Alternatively, lubricant flows from the measuring chamber 34, through the measuring chamber passage 52 and the valve passage second portion 55B, and into the delivery chamber 24.

Referring to FIGS. 1 and 11-13, in order to regulate the flow of lubricant between the three passages 50, 52 and 54, the injector 10 further comprises a valve member 60 disposed within the valve passage 54. The valve member 60 is movable between a first position $VP_1$ (FIG. 11), in which the body inlet 14 is fluidly coupled with the measuring chamber 34 through the measuring chamber passage 52, and a second position $VP_2$ (FIG. 12) in which the measuring chamber 34 is fluidly coupled with the delivery chamber 24 through the measuring chamber passage 52 and the valve passage 54. Preferably, the valve 60 includes a generally cylindrical, substantially solid body 62 linearly displaceable along the valve axis $A_V$ between the first and second positions $VP_1$, $VP_2$. The body 62 having an outer circumferential surface 63 and an annular groove 64 extending radially inwardly from the outer surface 63, the groove 64 generally dividing the body 62 into first and second plug sections 66A, 66B.

Figure 11:
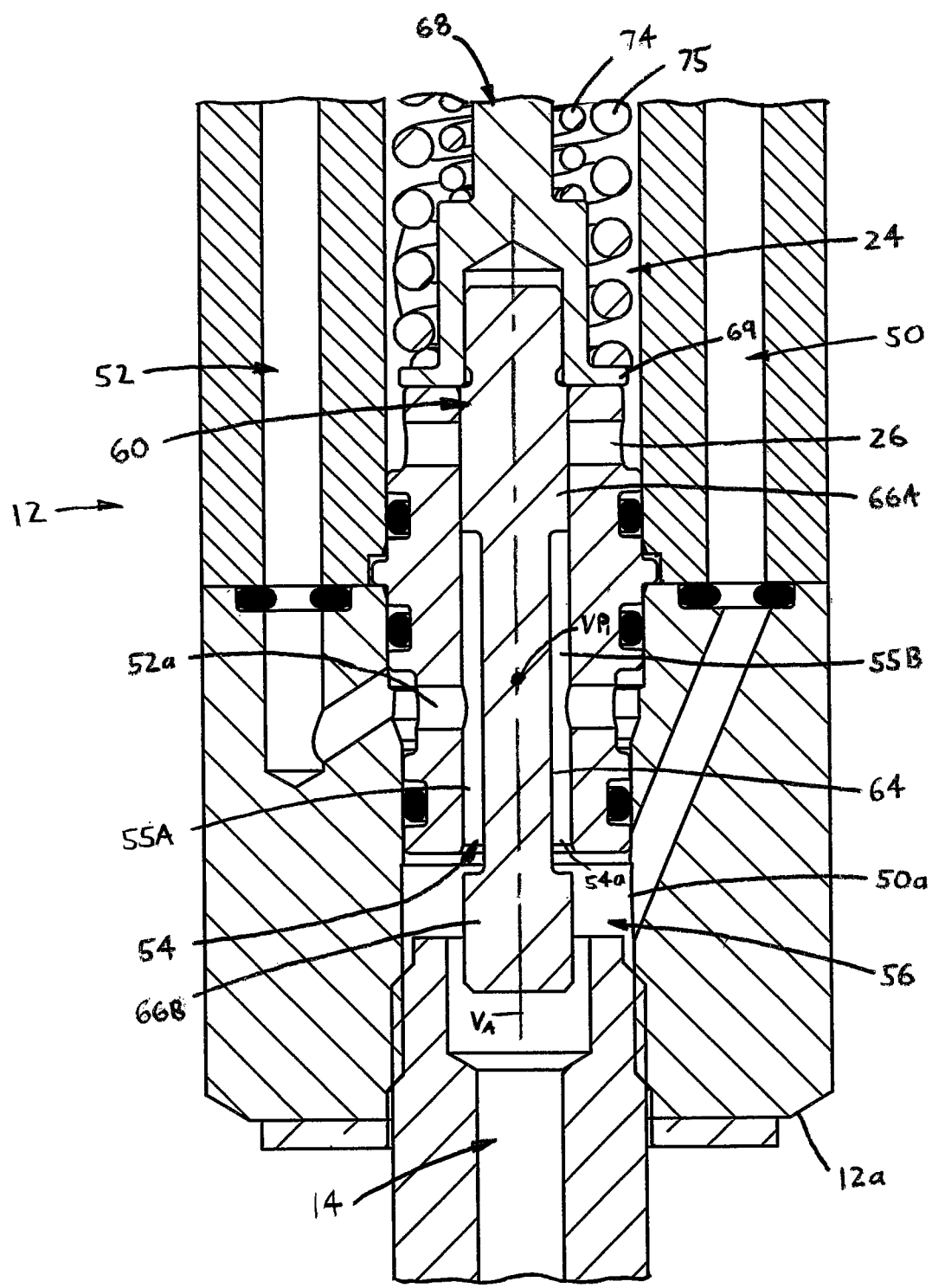
FIG. 11 is a broken-away, axial cross-sectional view of a lower portion of the injector, showing the valve member in a valve first position.
Figure 12:
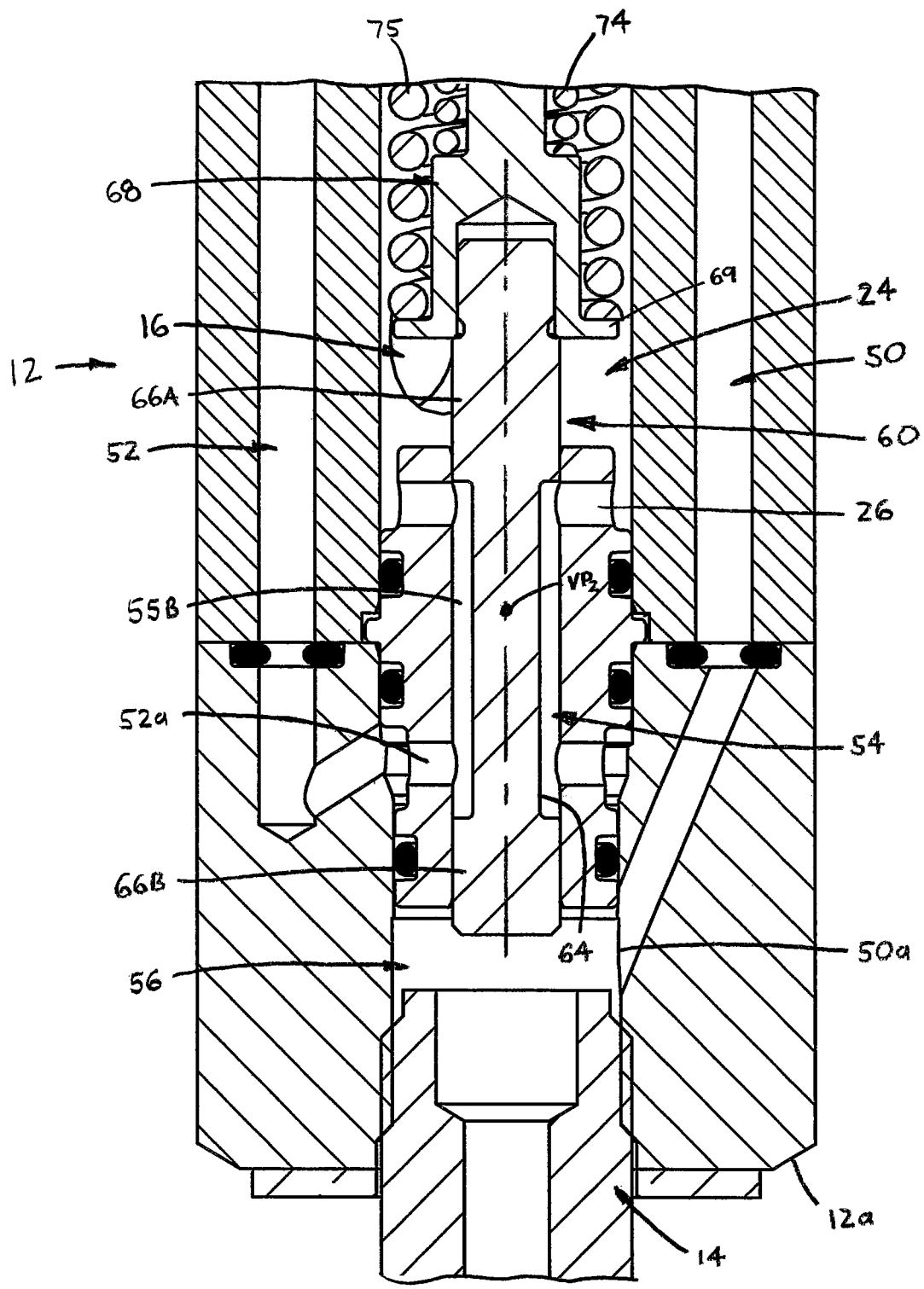
FIG. 12 is another view of the injector portion shown in FIG. 11, depicting the valve member in a valve second position.
Figure 13:
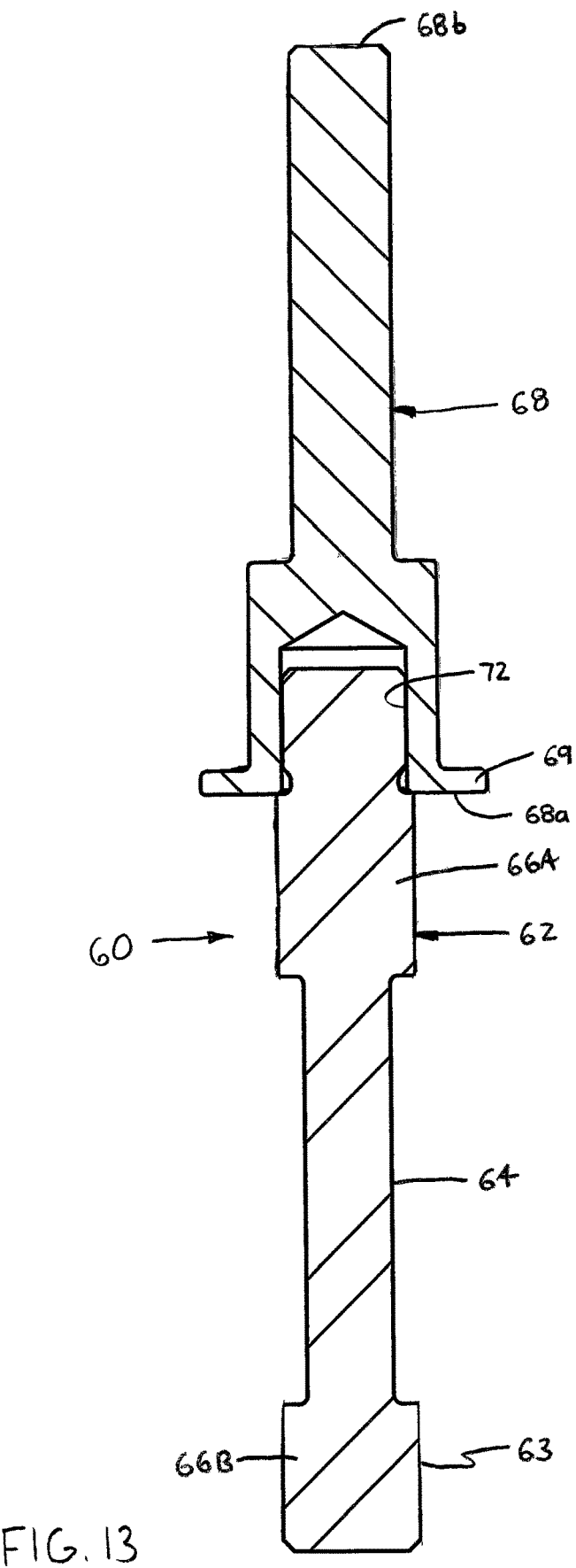
FIG. 13 is an axial cross-sectional view of a valve member and guide member.

With the above structure, when the valve member 60 is at the first position $VP_1$, as depicted in FIGS. 4 and 11, the valve groove 64 fluidly connects the measuring chamber passage 52 with the body inlet 14 while the first plug section 66A obstructs the delivery chamber inlet port 26. In this valve position, lubricant flows from the inlet 14 and/or the operating chamber 32, through the valve groove 64 and the measuring chamber passage 52 and into the measuring chamber 34. Alternatively, when the valve member 60 is at the second position $VP_2$, as shown in FIGS. 1 and 12, the valve groove 64 fluidly connects the measuring chamber passage 52 with the delivery chamber inlet port 26 while the second plug portion 66B substantially obstructs the valve passage inlet 54a. As such, in the second valve position $VP_2$, lubricant flows from the measuring chamber 34, through the measuring chamber passage 52 and the valve groove 64 and into the delivery chamber 24.

Referring to FIGS. 1, 4 and 11-13, the valve member 60 preferably further includes a guide rod 68 extending into the delivery chamber 24 and the injector 10 further comprises at least one and preferably two biasing members 70 disposed about the guide rod 68 and configured to bias the valve member 60 toward the valve first position $VP_1$. More specifically, the guide rod 68 has a lower circular flange portion 69 at a first end 68a proximal to the delivery chamber inlet 14, a bore 72 extending inwardly from the first end 68a and an opposing second end 68b spaced from the chamber inlet port 26. A portion of the first plug section 66A is disposed within the guide rod bore 72 to attach the rod 68 to the cylindrical body 62. Further, the guide rod second end 68b is contactable with the delivery chamber closed end 25b so as to prevent further valve displacement in the first direction $D_1$ along the valve axis $A_V$, the rod length (not indicated) being selected to position the valve member 60 at the valve second position $VP_2$ when the rod end 68b contacts the chamber end 25b, as depicted in FIG. 1.

Additionally, the two preferred biasing members 70 are preferably an inner, relatively smaller-diameter coil compression spring 74 disposed about the guide rod 68 and an outer, relatively larger-diameter coil spring 75 disposed about the inner spring 74. Each coil spring 74, 75 has a first end 74a, 75a disposed against the guide rod flange section 69 and a second end 74b, 75b disposed against a closed end 25b of the delivery chamber 24. As such, movement of the valve member 60 toward the valve second position $VP_2$ compresses the springs 74, 75 between the guide flange portion 70 and the delivery chamber closed end 25b, generating a biasing force $F_B$ that displaces the valve member 60 back toward the valve first position $VP_1$ when lubricant pressure on the valve body 62 decreases below a certain value.

Referring to FIGS. 1 and 15-17, the injector 10 preferably comprises a generally cylindrical plug 80 with a central bore 81, which is at least partially threaded, and is coupled with the body second end 12b so as to generally enclose the outer end 18a of the body elongated bore 18. The plug 80 preferably has a radially-outwardly extending shoulder 82 and a lower threaded portion 83 threadedly engaged with a threaded section 18c of the body elongated bore 18. The plug 80 is mounted to the body 12 by advancing the plug threaded section 83 along the bore threaded section 18c until the shoulder 82 contacts the second end 12b of the body 12. Further, a generally annular seal 84 is coupled with an inner end 80a of the plug 80, most preferably disposed within a counterbore 85 of the plug 80, and is configured to seal between the rod first section 39 and the plug 80. Thus, the seal 84 prevents lubricant leakage through the bore outer end 18a and out of the body second end 12b.

Further, a generally tubular adjustment member 86 is disposed at least partially within the plug bore 81 and has opposing axial ends 86a, 86b and a central through-hole 87 extending between the ends 86a, 86b. The inner axial end 86a provides a generally radial stop surface 88 and the adjustment member 86 is adjustably positionable within the plug bore 81 so as to vary an axial position of the stop surface 88. Preferably, at least a portion of the adjustment member outer surface 86c is threaded and is threadedly engaged with the plug bore 81, such that rotation of the adjustment member 86 varies the axial position of the stop surface 88, but the adjustment member 86 may be otherwise adjustably positionable within the plug 80 (e.g., by projections and grooves, detents, etc.). Furthermore, a cap 89 has an open end 89a engageable about the outer end 80b of the plug 80 and functions to enclose the outer ends 80b, 86b of the plug 80 and the adjustment member 86, respectively.

Figure 16:
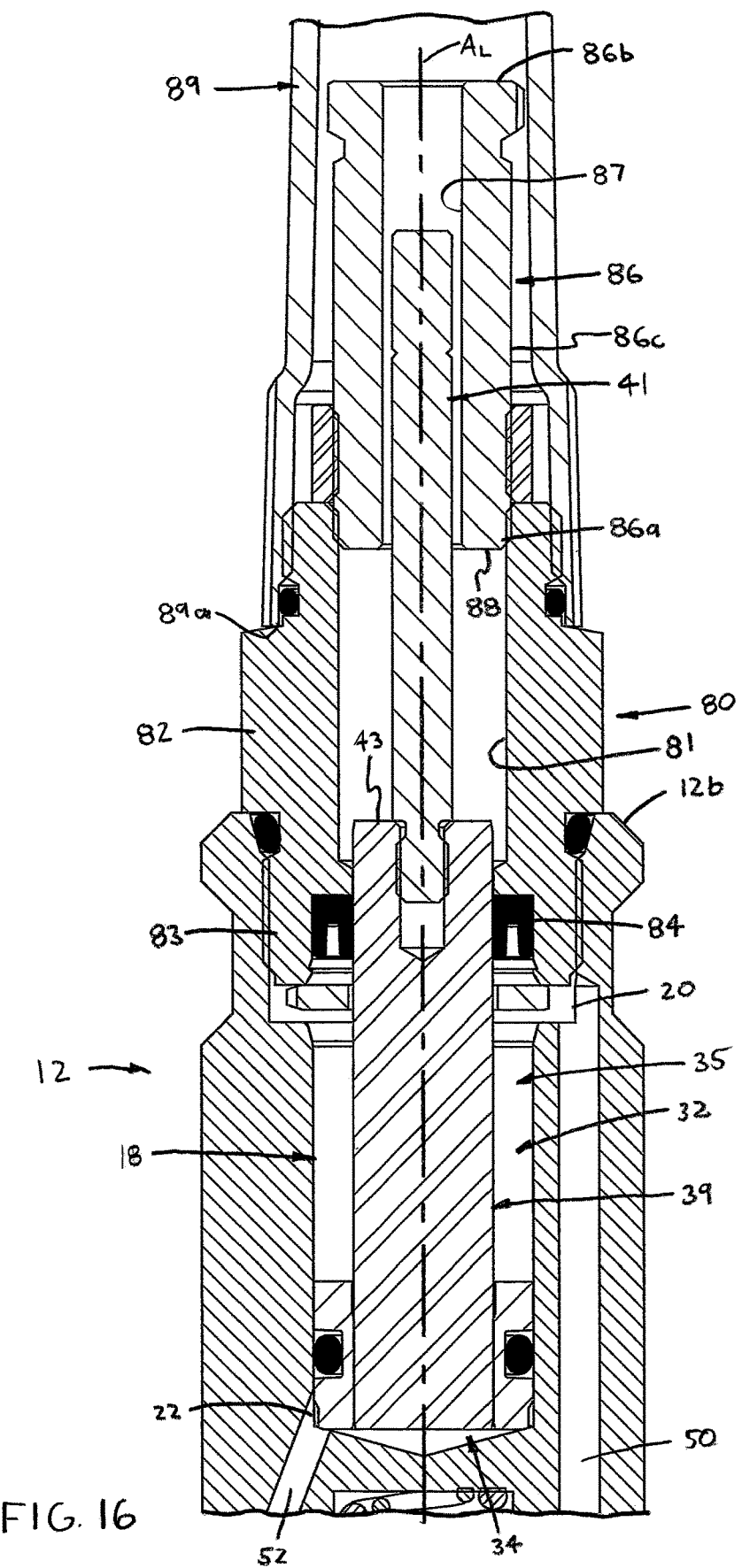
FIG. 16 is a broken-away, axial cross-sectional view of a top portion of the injector assembly including the piston, rod and the plug and adjustment member assembly, showing the adjustment member in a position to establish a maximum volume of the measuring chamber.
Figure 17:
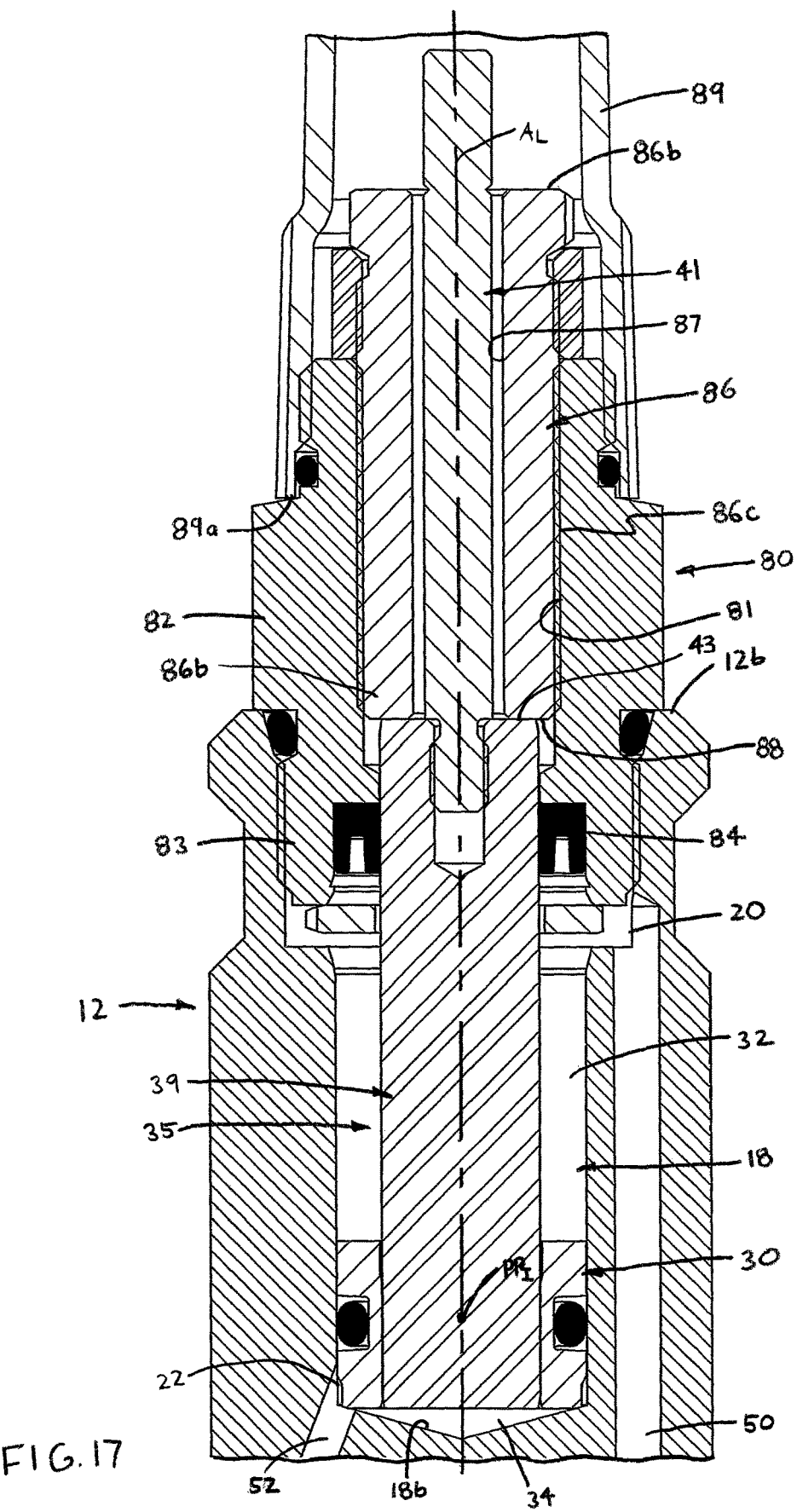
FIG. 17 is another view of the injector portion shown in FIG. 12, depicting the adjustment member in a position to establish a minimum volume of the measuring chamber.

With the plug and adjustment member assembly, the rod second section 41 is preferably disposed within the adjusting member through-hole 87, such that the rod section 41 axially displaces within the member 86 when the piston 30 displaces within the bore 18. The rod engagement surface 43 is contactable with the adjusting member stop surface 88 so as to limit axial displacement of the piston 30 in the first direction $D_1$ along the central axis $A_L$, as shown in FIG. 17. Thereby, the position of the adjustment member stop surface 88 establishes a desired volume of the measuring chamber 34 between a minimum value when the stop surface 88 is at a most proximal position to the plug inner end 80a (FIG. 17) and a maximum value when the stop surface 88 is located at a most distal position from the plug inner end 80a (FIG. 16). More specifically, displacement of the adjustment member 86 in the second axial direction $D_2$ toward the plug inner end 80a decreases the potential volume of the measuring chamber 34, thereby decreasing the volume of the lubricant delivered by the injector 10 as discussed in detail below. Conversely, displacement of the adjustment member 86 in the first axial direction $D_1$ away from the plug inner end 80a increases the potential volume of the measuring chamber 34, thereby increasing the volume of the lubricant delivered by the injector 10.

Referring to FIGS. 1, 4 and 10, the injector body 12 is preferably formed of two-piece construction including a base member 90 providing the body first end 12a and a main body section 92 extending to the body second end 12b. The base section 90 is generally rectangular, has opposing axial ends 90a, 90b and provides the body inlet 14 and inlet chamber 56, a first section 51A of the operating chamber passage 50, a first section 53A of the measuring chamber passage 52, the valve passage 54 and the inlet chamber 56. The main body section 92 has opposing first and second ends 92a, 92b, is generally elongated and extends along the longitudinal axis $A_L$, and most preferably has generally rectangular radial cross sections through the axis $A_L$, but may alternatively be generally circular cylindrical, generally hexagonal or any other appropriate shape as desired. The main body section 92 provides the elongated bore 18, the delivery chamber 24, a second section 51B of the operating chamber passage 50 and a second portion 53B of the measuring chamber passage 52. The main body first end 92a is attached to the base section second end 90b to form an interface 95 and two sealing members 96, preferably O-rings, are provided within the interface to seal about the fluid connections between the operating and measuring chamber passage sections 51A, 51B and 53A, 53B of the operating and measuring chamber passages 50, 52, respectively.

Figure 14:
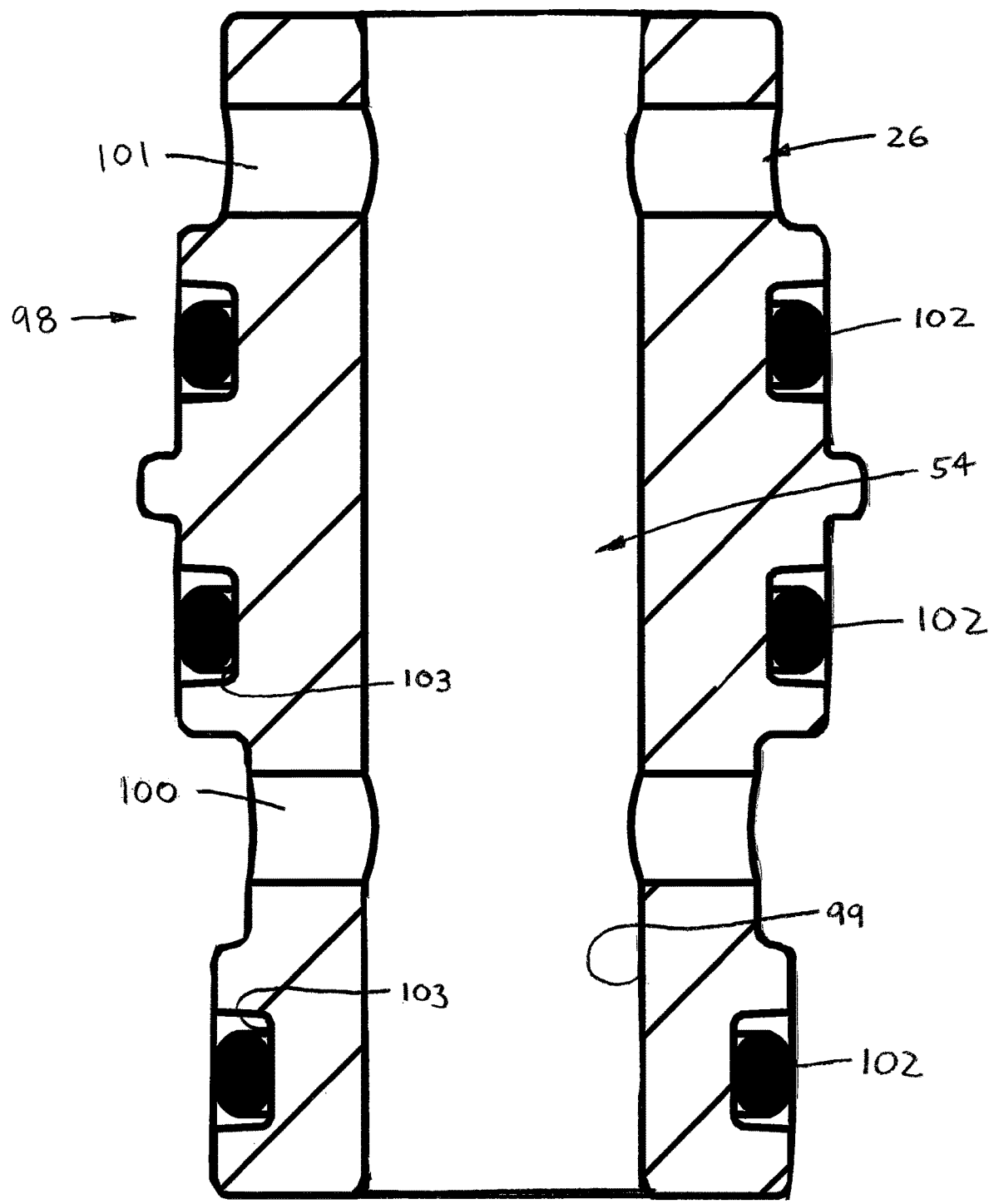
FIG. 14 is an axial cross-sectional view of an insert providing a valve passage and a delivery chamber inlet port.
Figure 15:
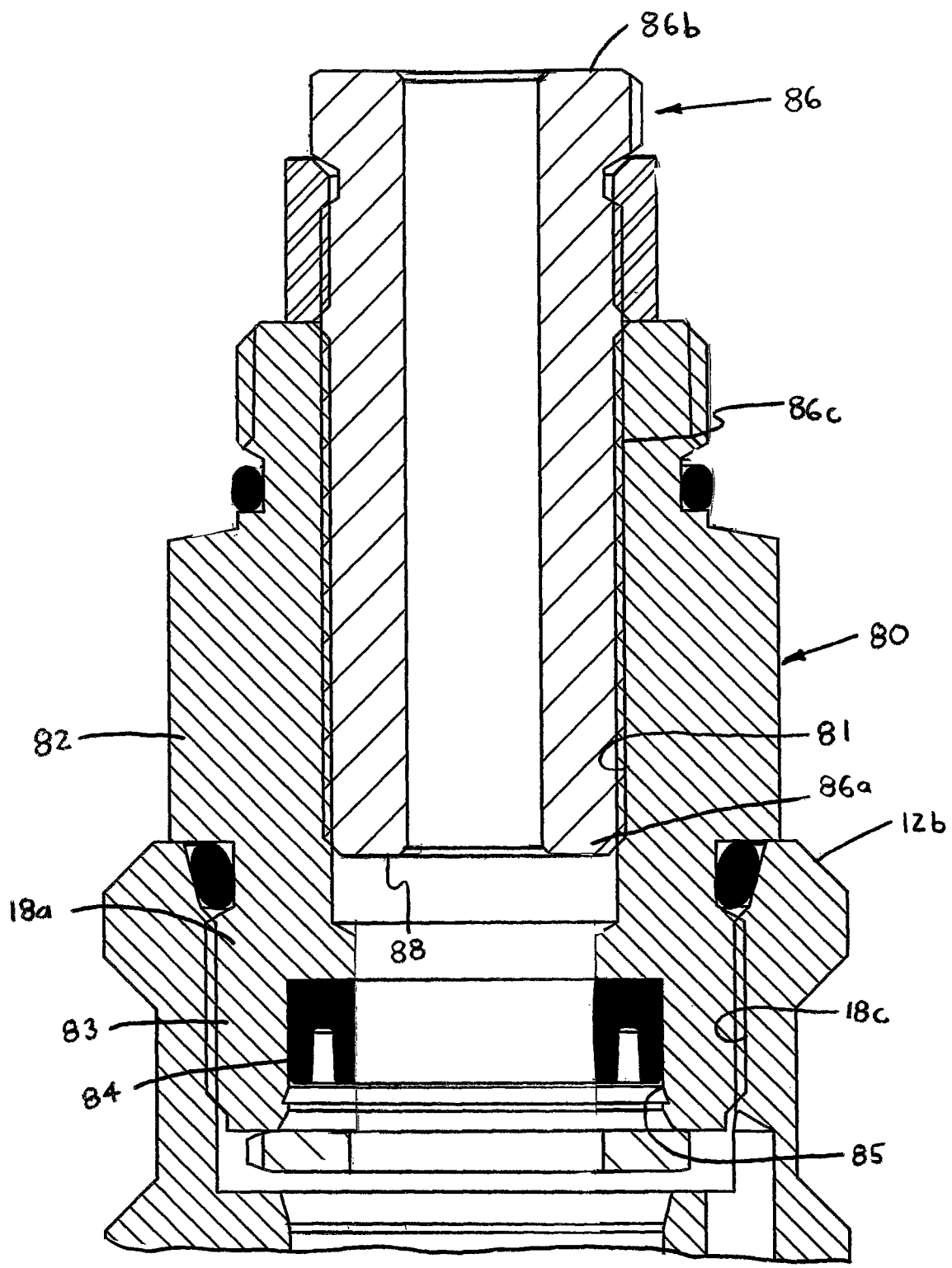
FIG. 15 is a broken-away, axial cross-sectional view of the injector showing a plug member and an adjustment member for establishing a predetermined volume of the measuring chamber.

Referring now to FIGS. 10 and 14, the valve passage 54 and the delivery chamber inlet port 26 are each preferably provided by a generally cylindrical insert member 98 disposed within a through bore 99 of the body base section 90. The insert 98 has a central bore 99 providing the valve passage 54, a first radial passage 100 connected with the measuring chamber passage first section 53A, and a second radial passage 101 providing the delivery chamber inlet port 26. Further, the insert 98 also has a plurality of sealing members 102 disposed within annular grooves 103 in the insert outer surface 98a for sealing between the insert 98 and the body base section 90. However, the valve passage 54 and/or the delivery chamber inlet port 26 may alternatively be provided by holes directly machined in the base section 90 (structure not shown).

By having such an insert 98, the insert 98 and the valve member 60 may be formed of wear resistant materials, such as a tool steel, and the body base section 90 and main body section 92 may be formed of materials different than the materials of the insert 98 and the valve member 60. For example, when used in a potentially corrosive environment, the body sections 90, 92 may be formed of stainless steel and when the weight of the injector 10 is an important consideration, the body sections 90, 92 may be formed of a lightweight material, such as aluminum. By providing the insert 98 as opposed to machining the passage 54 and the port 26 directly within the body sections 90, 92, such a selection of different materials is made possible.

Figure 5:
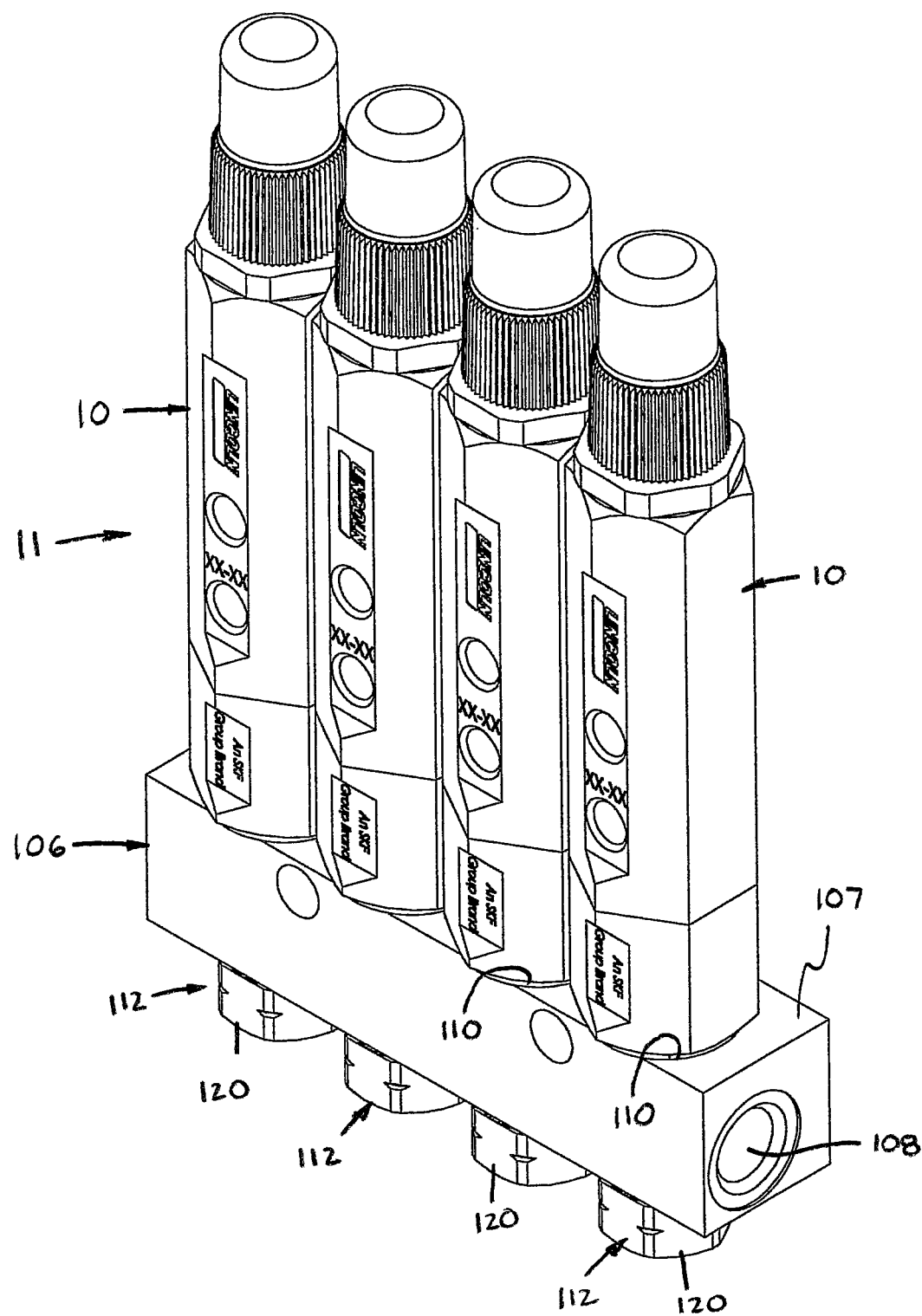
FIG. 5 is a perspective view of a plurality of the injectors on a lubrication manifold.

Referring to FIGS. 2 and 5, the injector 10 is typically used in a "bank" 11 of injectors 10 that includes a plurality of the injectors (e.g., four injectors 10) each coupled with a common manifold 106. The manifold 106 includes a main lubricant passage 108 and a plurality of outlet bores 110 extending radially from the main passage 108 to an interface surface 107 of the manifold. Each injector 10 is disposable on the interface surface 107 such that the injector body inlet 14 is generally aligned with a separate one of the outlet bores 110.

Referring to FIGS. 1-5, when the injectors 10 are used with a manifold 106, the injector 10 preferably further comprises a connector 112 configured to couple the injector body 12 with the manifold 106. The connector 112 has a central fluid passage 114, a generally radial through passage 116 connected with central passage 14 and with the manifold passage 108, and an outlet 118 disposed within the body inlet 14. As such, lubricant within the manifold passage 108 flows into the radial passage 116, a portion of which enters the connector central passage 114 and the remainder returns to the manifold passage to subsequently flow into the connectors 112 of adjacent injectors 10. The portion of lubricant entering the connector central passage 114 then passes through the connector outlet 118 and into the injector inlet 14, to flow therethrough as described in detail below.

Preferably, each connector 112 is formed generally as a threaded bolt 118 having an outer threaded section 118a engaged with an inner threaded section 56a of the injector body inlet chamber 56 and a head 120 disposed against a lower surface 109 of the manifold 110, and extends through another radial passage (not shown) aligned with an associated radial passage 116. However, the connector 112 may be formed so as to be disposed only in the outlet bore 110 and have any appropriate shape, or the body 12 may be formed to connect directly to the manifold 110 without a separate connector. Furthermore, the injectors 10 may also be alternatively formed to connect directly to a lubricant supply line 5 without any manifold.

Figure 18C:
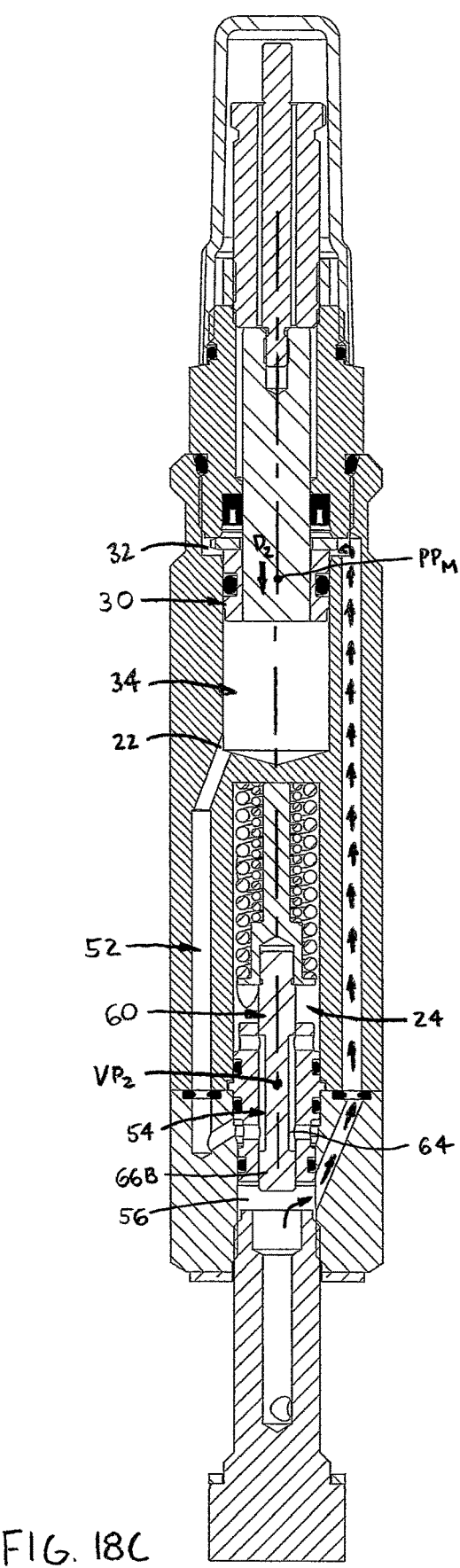

Referring now to FIGS. 18A-18D, in use, the injector 10 functions generally in the following manner. As lubricant pressure increases at the body inlet 14, caused by operation of the pump 4, the lubricant flows from the inlet chamber 56 (preferably from the associated manifold 100 and connector 112) and into the valve passage first end 54a, while the valve member 60 is in the first position $VP_1$, fluidly coupling the inlet 14 with the measuring chamber passage 52, as depicted in FIG. 18A. Lubricant does not enter the operating chamber passage 50 as the operating chamber 32 is filled with lubricant with the piston 30 at the piston initial position $PP_I$, but rather flows through the measuring chamber passage 52 and into the measuring chamber 34. Due to the relatively greater surface area of the piston first pressure surface 40 compared to the second pressure surface 42, force on the piston first axial end 36a is greater than the force $F_2$ on the second axial end 30b, causing the piston 30 to displace in the first direction $D_1$ while lubricant fills the measuring chamber 34 until the rod engagement surface 41 contacts the adjustment member stop surface 88, as depicted in FIG. 18B, such that the piston 30 is located at the piston maximum position $PP_M$. As the measuring chamber volume increases, the corresponding decrease in volume of the operating chamber 32 forces lubricant from the chamber 32 and through the operating chamber passage 50 to the inlet chamber 56. Due to the relative sizing of the pressure surfaces 40, 42, the displacement of the piston 30 to the maximum position $PP_M$, and thereby the filling of the measuring chamber 34 with the desired, predetermined quantity of lubricant, occurs more rapidly than with previously known injectors.

At this point, no further lubricant is able to enter the measuring chamber 34, which now contains the predetermined lubricant quantity, causing lubricant pressure to increase in the inlet chamber 56. The pressure in the inlet chamber 56 is exerted on the valve member 60, specifically the second plug section 66B, and increases until sufficient to displace the valve member 60 from the first position $VP_1$ to the second position $VP_2$, as depicted in FIG. 18C. As such, the valve second plug section 66B prevents flow through the valve passage first end 54a and the valve groove 64 fluidly connects the measuring chamber passage 52 with the delivery chamber inlet port 26. Lubricant continues to flow into the operating chamber 32 until pressure in the chamber 32 is sufficiently high to overcome the surface area differential between the piston pressure surfaces 40, 42.

Figure 18D:
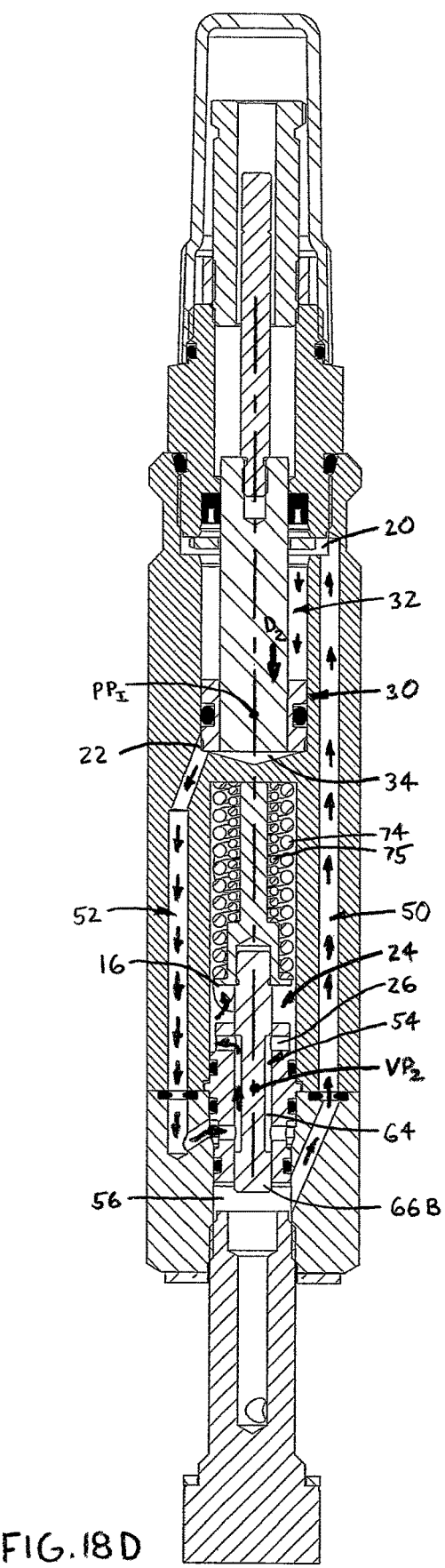

Then, the piston 30 displaces in the second axial direction $D_2$ and causes lubricant in the measuring chamber 34 to flow out the bore second port 22, through the measuring chamber passage 52 and the valve groove 64, and into the delivery chamber 24, as shown in FIG. 18D. The displacement of lubricant from the measuring chamber 34 pushes an equal volume of lubricant out of the delivery chamber 24 through the body outlet(s) 16, and ultimately to the delivery point DP. Once the lubricant is delivered, pressure within the injector 16 decreases, causing the springs 74, 75 to displace the valve member 60 to the valve first position $VP_1$ while the piston 30 is disposed at the piston initial position $PP_I$, as depicted in FIG. 18A, and therefore ready to repeat the injector cycle as described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A lubricant injector for delivering a predetermined quantity of lubricant, the injector comprising:
   a body having opposing first and second ends and a longitudinal axis extending generally between the two ends, the body including an inlet at the first end fluidly coupleable to a source of lubricant, an outlet, a delivery chamber fluidly coupled with the outlet and an elongated bore spaced axially from the body inlet and having a first port fluidly connected with the body inlet and a second port disposed axially between the body inlet and the first port and fluidly connected with the delivery chamber, the bore being defined by a substantially circular cylindrical inner circumferential surface having an inside diameter, the inside diameter having a substantially constant value along the axis; and a piston disposed within the elongated bore so as to divide the bore into an operating chamber fluidly coupled with the first port and a measuring chamber fluidly coupled with the second port, the measuring chamber being located axially between the operating chamber and the body first end, the piston including a generally circular cylindrical body having opposing first and second axial ends and an outer surface and an outer circumferential surface extending axially between the ends and slidably disposed against the bore inner surface, the outer surface having an outside diameter that is generally constant along the axis between the first and second ends.

2. The lubricant injector as recited in claim 1 further comprising a rod connected with the piston so as to extend generally axially from the piston second axial end and through the operating chamber section, the rod having an outside diameter.

3. The injector as recited in claim 2 wherein:

the piston has a first, substantially circular radial pressure surface on the first axial end, the first pressure surface partially bounding the measuring chamber and having a first surface area, and a second, generally annular radial pressure surface on the second axial end defined between the rod outer perimeter and the piston outer perimeter, the second pressure surface partially bounding the operating chamber and having a second surface area;

the piston is axially displaceable solely by a differential between a first force generated by lubricant pressure exerted on the first pressure surface and a second force generated by lubricant pressure exerted on the second pressure surface; and the rod is sized such that a ratio between the rod outside diameter at the piston second end and the piston outside diameter is at least 0.5 to provide a desired ratio between the second pressure surface area and the first pressure surface area.

4. The injector as recited in claim 3 wherein the ratio between the rod outside diameter and the piston outside diameter has a value within a range of between about 0.5 and about 0.7.

5. The injector as recited in claim 3 wherein:

the injector body is generally elongated and extends generally along the axis and the delivery chamber is disposed generally axially between the inlet and the measuring chamber;

the injector body further includes an operating chamber passage extending between and fluidly connecting the body inlet and the first port of the elongated bore, a valve passage extending between and fluidly connecting the body inlet and the inlet port of the delivery chamber, and a measuring chamber passage extending between and fluidly connecting the second port of the elongated bore with the valve passage; and the delivery chamber is fluidly coupled with the measuring chamber through the measuring chamber passage such that lubricant in the measuring chamber passes through the measuring chamber passage, the valve passage and the delivery chamber and out of the injector through the outlet.

6. The injector as recited in claim 2 wherein the a rod includes a first, diametrically-larger rod section having a first end attached to the piston and an opposing second end with a generally radial engagement surface, and a second, diametrically-smaller rod section attached to the second end of the first rod section.

7. The injector as recited in claim 6 further comprising:

a generally cylindrical plug coupled with the body second end so as to generally enclose an end of the body elongated bore, the plug having a central bore; and a generally tubular adjustment member disposed at least partially within the plug bore and having opposing axial ends and a central through-hole extending between the ends, an inner axial end providing a generally radial stop surface, the adjustment member being adjustably positionable within the plug bore so as to vary an axial position of the stop surface; and wherein the rod first section has a generally radial engagement surface on the second axial end and the second rod section is slidably disposed within the adjusting member through-hole, the rod engagement surface being contactable with the adjusting member stop surface so as to limit axial displacement of the piston in a first direction along the central axis.

8. The injector as recited in claim 7 further comprising a generally annular seal coupled with an inner end of the plug and configured to seal between the rod first section and the plug.

9. The injector as recited in claim 1 wherein the injector body is generally elongated and extends generally along the axis and the delivery chamber is disposed generally axially between the inlet and the measuring chamber.

10. The injector as recited in claim 1 wherein the injector body further includes:

an operating chamber passage extending between and fluidly connecting the body inlet and the first port of the elongated bore;

a valve passage extending between and fluidly connecting the body inlet and the inlet port of the delivery chamber; and a measuring chamber passage extending between and fluidly connecting the second port of the elongated bore with the valve passage.

11. The injector as recited in claim 10 wherein the injector further comprises a valve member disposed within the valve passage and a portion of the measuring chamber passage, the valve member being movable between a first position in which the body inlet is fluidly coupled with the measuring chamber and a second position in which the measuring chamber is fluidly coupled with the delivery chamber.

12. The injector as recited in claim 11 wherein:

the valve includes a generally cylindrical, substantially solid body linearly displaceable along a valve axis between first and second position, the body having an outer circumferential surface and an annular groove extending radially inwardly from the outer surface, the groove generally dividing the body into first and second plug sections;

the measuring chamber passage has an inlet fluidly coupled with the body inlet;

the valve groove fluidly connects the remainder of the measuring chamber passage with the body inlet while the first plug section obstructs the delivery chamber inlet port when the valve is at the first position; and the valve groove fluidly connects the remainder of the measuring chamber passage with the delivery chamber inlet port while the second plug portion substantially obstructs the measuring chamber passage inlet when the valve is at the second position.

13. The injector as recited in claim 11 wherein:
the valve further includes a guide rod attached to the first plug section of the cylindrical body and disposed within the delivery chamber; and
the injector further comprises at least one biasing member disposed within the delivery chamber and about the guide rod, the biasing member being configured to bias the valve toward the valve first position.

14. The injector as recited in claim 1 wherein the elongated body includes:
a base section at the body first end providing the body inlet, a first portion of the operating chamber passage, a first portion of the measuring chamber passage and the valve passage; and
a main body section attached to the base section so as to extend generally along the axis to the body second end and providing the elongated bore, a second portion of the operating chamber passage and a second portion of the measuring chamber passage.

15. A lubricant injector for delivering a predetermined quantity of lubricant, the injector comprising:
a body having opposing first and second ends and a longitudinal axis extending generally between the two ends, the body including an inlet at the first end fluidly coupleable to a source of lubricant, an outlet, a delivery chamber fluidly coupled with the outlet and an elongated bore spaced axially from the body inlet and having a first port fluidly connected with the body inlet and a second port disposed axially between the body inlet and the first port and fluidly connected with the delivery chamber, the bore being defined by a substantially circular cylindrical inner circumferential surface having an inside diameter, the inside diameter having a substantially constant value along the axis; and
a piston disposed within the elongated bore so as to divide the bore into an operating chamber fluidly coupled with the first port and a measuring chamber fluidly coupled with the second port, the measuring chamber being located axially between the operating chamber and the body first end, the piston including a generally circular cylindrical body having opposing first and second axial ends and an outer surface and an outer circumferential surface extending axially between the ends and slidably disposed against the bore inner surface, the outer surface having an outside diameter that is generally constant along the axis between the first and second ends; and
a rod connected with the piston so as to extend generally axially away from the piston second axial end and through the operating chamber section, the rod having an outside diameter; and
wherein the piston has a first, substantially circular radial pressure surface on the first axial end, the first pressure surface partially bounding the measuring chamber and having a first surface area, and a second, generally annular radial pressure surface on the second axial end defined between the rod outer perimeter and the piston outer perimeter, the second pressure surface partially bounding the operating chamber and having a second surface area, the piston being axially displaceable solely by a differential between a first force generated by lubricant pressure exerted on the first pressure surface and a second force generated by lubricant pressure exerted on the second pressure surface.

16. The injector as recited in claim 15 wherein the rod is sized such that a ratio between the rod outside diameter at the piston second end and the piston outside diameter is at least 0.5 to provide a desired ratio between the second pressure surface area and the first pressure surface area.

17. The injector as recited in claim 16 wherein the ratio between the rod outside diameter and the piston outside diameter is between about 0.5 and about 0.7.

18. The injector as recited in claim 15 wherein:
the injector body is generally elongated and extends generally along the axis and the delivery chamber is disposed generally axially between the inlet and the measuring chamber.
the injector body further includes an operating chamber passage extending between and fluidly connecting the body inlet and the first port of the elongated bore, a measuring chamber passage extending between and fluidly connecting the body inlet and the second port of the elongated bore, and a valve passage extending between and fluidly connecting the measuring chamber passage and the inlet port of the delivery chamber; and
the delivery chamber is fluidly coupled with the measuring chamber through the measuring chamber passage such that lubricant in the measuring chamber passes through the measuring chamber passage, the valve passages and the delivery chamber and out of the injector through the outlet.

19. The injector as recited in claim 15 wherein the injector body further includes:
a operating chamber passage extending between and fluidly connecting the body inlet and the first port of the elongated bore;
a measuring chamber passage extending between and fluidly connecting the body inlet and the second port of the elongated bore; and
a valve passage extending between and fluidly connecting the measuring chamber passage and the inlet port of the delivery chamber.

20. The injector as recited in claim 19 wherein:
the injector further comprises a valve member disposed within the valve passage and a portion of the measuring chamber passage, the valve member including a generally cylindrical, substantially solid valve body linearly displaceable along a valve axis between first and second positions, the body having an outer circumferential surface and an annular groove extending radially inwardly from the outer surface, the groove generally dividing the body into first and second plug sections;
the measuring chamber passage has an inlet fluidly coupled with the body inlet;
the valve groove fluidly connects a remainder of the measuring chamber passage with the body inlet while the first plug section obstructs the delivery chamber inlet port when the valve is at the first position; and
the valve groove fluidly connects the remainder of the measuring chamber passage with the delivery chamber inlet port while the second plug portion substantially obstructs the measuring chamber passage inlet when the valve is at the second position.

* * * * *